US012552166B2

(12) United States Patent
Takahashi et al.

(10) Patent No.: US 12,552,166 B2
(45) Date of Patent: Feb. 17, 2026

(54) DISCHARGE HEAD, DISCHARGE HEAD UNIT, DISCHARGE APPARATUS, AND PRINTER

(71) Applicants: Kouichi Takahashi, Kanagawa (JP); Yoshinori Bandoh, Kanagawa (JP)

(72) Inventors: Kouichi Takahashi, Kanagawa (JP); Yoshinori Bandoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 159 days.

(21) Appl. No.: 18/605,880

(22) Filed: Mar. 15, 2024

(65) Prior Publication Data

US 2024/0326431 A1 Oct. 3, 2024

(30) Foreign Application Priority Data

Mar. 27, 2023 (JP) ................................ 2023-049290

(51) Int. Cl.
*B41J 2/14* (2006.01)
*B41J 2/165* (2006.01)

(52) U.S. Cl.
CPC ............. *B41J 2/1433* (2013.01); *B41J 2/165* (2013.01)

(58) Field of Classification Search
CPC . B41J 2/1433; B41J 2/165; B41J 2002/14475
See application file for complete search history.

(56) References Cited

U.S. PATENT DOCUMENTS

2013/0050346 A1* 2/2013 Takeuchi ................ B41J 2/185 427/458
2020/0156374 A1 5/2020 Bandoh
2020/0298582 A1 9/2020 Bandoh
2021/0094298 A1 4/2021 Bandoh
2021/0260874 A1 8/2021 Bandoh
2022/0143977 A1 5/2022 Bandoh
2023/0241890 A1 8/2023 Shingyoh et al.

FOREIGN PATENT DOCUMENTS

JP 2007-203465 A 8/2007
JP 2010-228216 A 10/2010
JP 2012-196792 A 10/2012
JP 2023-140528 A 10/2023

* cited by examiner

*Primary Examiner* — Bradley W Thies
(74) *Attorney, Agent, or Firm* — XSENSUS LLP

(57) ABSTRACT

A discharge head includes a nozzle face, multiple nozzles, and a projection. The multiple nozzles are arrayed in a first direction on the nozzle face to define a nozzle row; are dischargeable a liquid from each of the multiple nozzles in a discharge direction; and has an end nozzle at an end of the nozzle row in the first direction. The projection projects in the discharge direction from the nozzle face. The projection is disposed: between one side of the nozzle face and the nozzle row in a second direction; and at the end nozzle in the first direction. The projection has: a first side wall outside the end nozzle in the first direction and having a first face parallel to the second direction; and a second sidewall inside the end nozzle in the first direction and having a second face slanted or curved with respect to the second direction.

20 Claims, 15 Drawing Sheets

FIG. 6 COMPARATIVE EXAMPLE
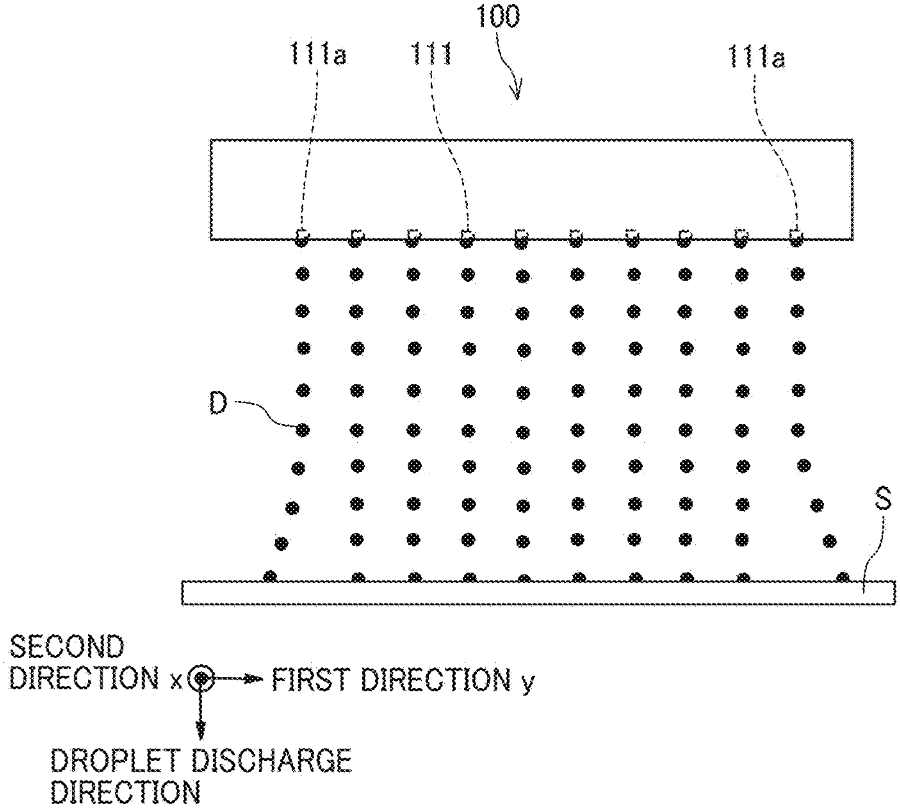
FIG. 7 COMPARATIVE EXAMPLE
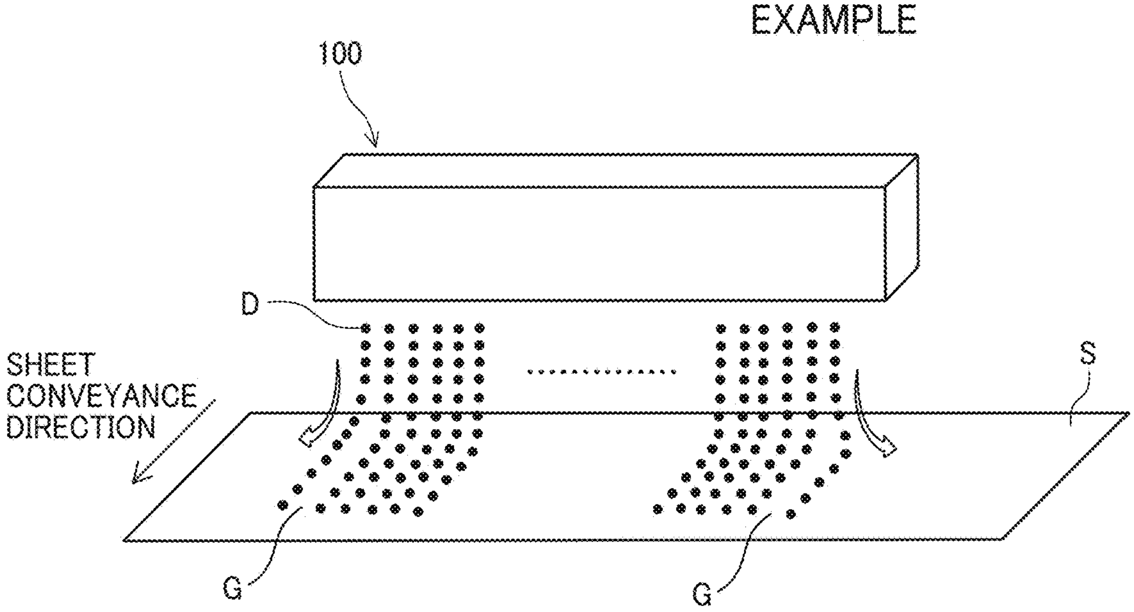

COMPARATIVE EXAMPLE

DISCHARGE HEAD, DISCHARGE HEAD UNIT, DISCHARGE APPARATUS, AND PRINTER

CROSS-REFERENCE TO RELATED APPLICATION

This patent application is based on and claims priority pursuant to 35 U.S.C. § 119(a) to Japanese Patent Application No. 2023-049290, filed on Mar. 27, 2023, in the Japan Patent Office, the entire disclosure of which is hereby incorporated by reference herein.

BACKGROUND

Technical Field

Embodiments of the present disclosure relate to a discharge head, a discharge head unit, a discharge apparatus, and a printer.

Related Art

In the related art, a printer discharges a liquid to print images on an object to which the liquid is applied. For example, the printer includes a discharge head including a nozzle row in which multiple nozzles are arrayed or a head array (discharge head unit) on which multiple head modules (discharge heads) are mounted. The printer moves the discharge head (or the head array) and the object relative to each other to print a desired image on the object.

SUMMARY

Embodiments of the present disclosure describe an improved discharge head that includes a nozzle face, multiple nozzles, and a projection. The multiple nozzles are arrayed in a first direction on the nozzle face to define a nozzle row, are dischargeable a liquid from each of the multiple nozzles in a discharge direction perpendicular to the nozzle face, and has an end nozzle at an end of the nozzle row in the first direction. The projection projects in the discharge direction from the nozzle face. The projection is disposed: between one side of the nozzle face and the nozzle row in a second direction intersecting the first direction; and at the end nozzle in the first direction. The projection has a first side wall and a second side wall. The first sidewall is disposed outside the end nozzle in the first direction and has a first face perpendicular to the nozzle face and parallel to the second direction. The second sidewall is disposed inside the end nozzle in the first direction and has a second face perpendicular to the nozzle face and slanted or curved with respect to the second direction.

According to another embodiment of the present disclosure, there is provided a discharge head including a nozzle face, multiple nozzles, and a projection. The nozzle face has longitudinal sides extending in a first direction and transverse sides extending in a second direction intersecting the first direction. The multiple nozzles are arrayed in a third direction intersecting the first direction and the second direction on the nozzle face to define a nozzle row, are dischargeable a liquid from each of the multiple nozzles in a discharge direction perpendicular to the nozzle face, and has an end nozzle at an end of the nozzle row in the third direction. The projection projects in the discharge direction from the nozzle face. The projection is disposed: between one of the longitudinal sides and the nozzle row in the second direction; and at the end nozzle closest to the one of the longitudinal sides among the multiple nozzles in the second direction. The projection has a first sidewall and a second sidewall. The first sidewall is disposed outside the end nozzle in the first direction and has a first face perpendicular to the nozzle face and parallel to the second direction. The second sidewall is disposed inside the end nozzle in the first direction and has a second face perpendicular to the nozzle face and slanted or curved with respect to the second direction.

According to yet another embodiment of the present disclosure, there is provided a discharge head unit including a first discharge head and a second discharge head joined to the first discharge head in a first direction to form a joint portion extending in a second direction intersecting the first direction between the first discharge head and the second discharge head. Each of the first discharge head and the second discharge head includes a nozzle face, multiple nozzles, and a projection. The nozzle face has longitudinal sides extending in the first direction. The multiple nozzles are arrayed in a third direction intersecting the first direction and the second direction on the nozzle face in multiple rows in the second direction to define multiple nozzle rows; are dischargeable a liquid from each of the multiple nozzles in a discharge direction perpendicular to the nozzle face; and has an end nozzle at an end of the multiple nozzle rows in the third direction. At least one of the multiple nozzles at an end of the multiple nozzle rows of the first discharge head overlaps with at least one of the multiple nozzles at an end of the multiple nozzle rows of the second discharge head in the first direction in the joint portion. The projection is disposed between one of the longitudinal sides and the end nozzle. The end nozzle is disposed in the joint portion and closest to the one of the longitudinal sides among the multiple nozzles of the first discharge head and the second discharge head in the second direction. The projection projects in the discharge direction from the nozzle face of one of the first discharge head and the second discharge head having the end nozzle. The projection has a first side wall and a second sidewall. The first sidewall is disposed outside the end nozzle in the first direction and has a first face perpendicular to the nozzle face and parallel to the second direction. The second sidewall is disposed inside the end nozzle in the first direction and has a second face perpendicular to the nozzle face and slanted or curved with respect to the second direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a schematic front view of a discharge head according to a first comparative example, corresponding to FIG. 2;

FIG. 7 is a schematic perspective view of the discharge head of FIG. 6, according to the first comparative example, illustrating droplets that fly and land on a sheet;

Figure 1:
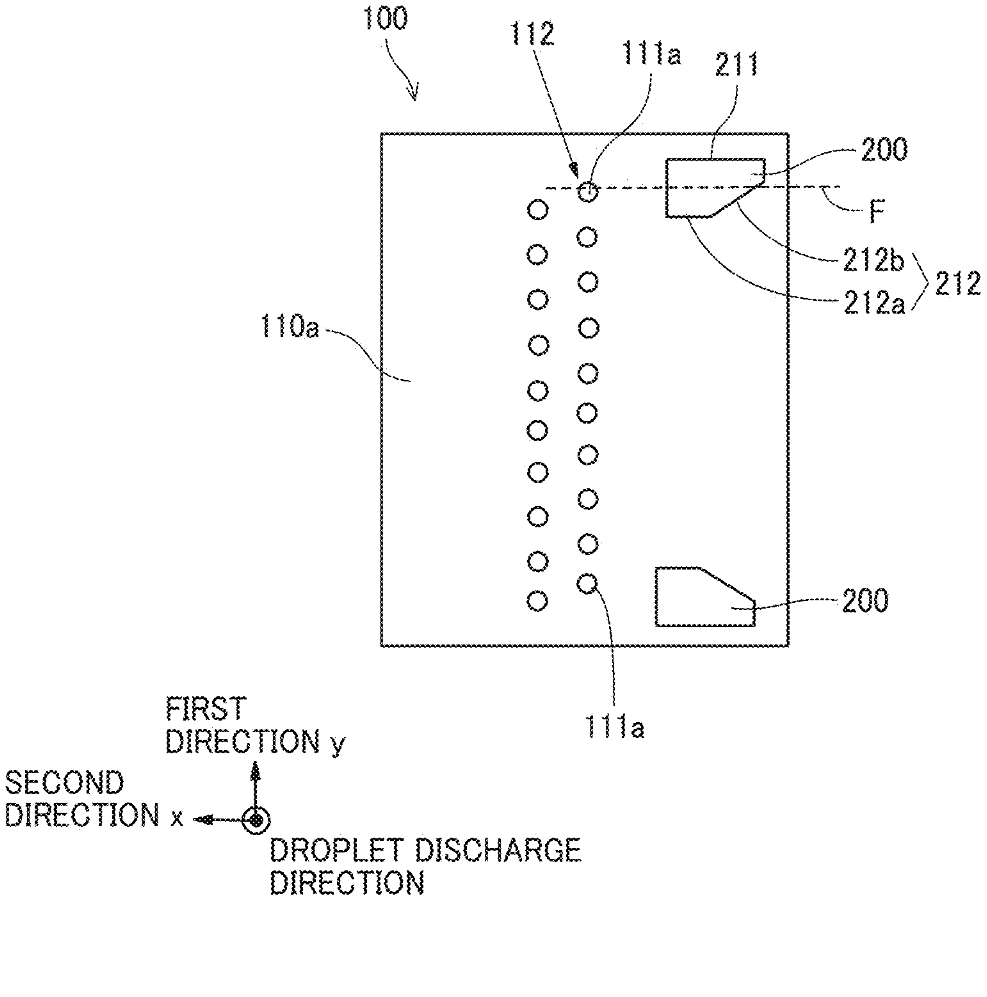
FIG. 1 is a schematic plan view of a discharge head according to a first embodiment of the present disclosure as viewed from the nozzle face side thereof.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Figure 2:
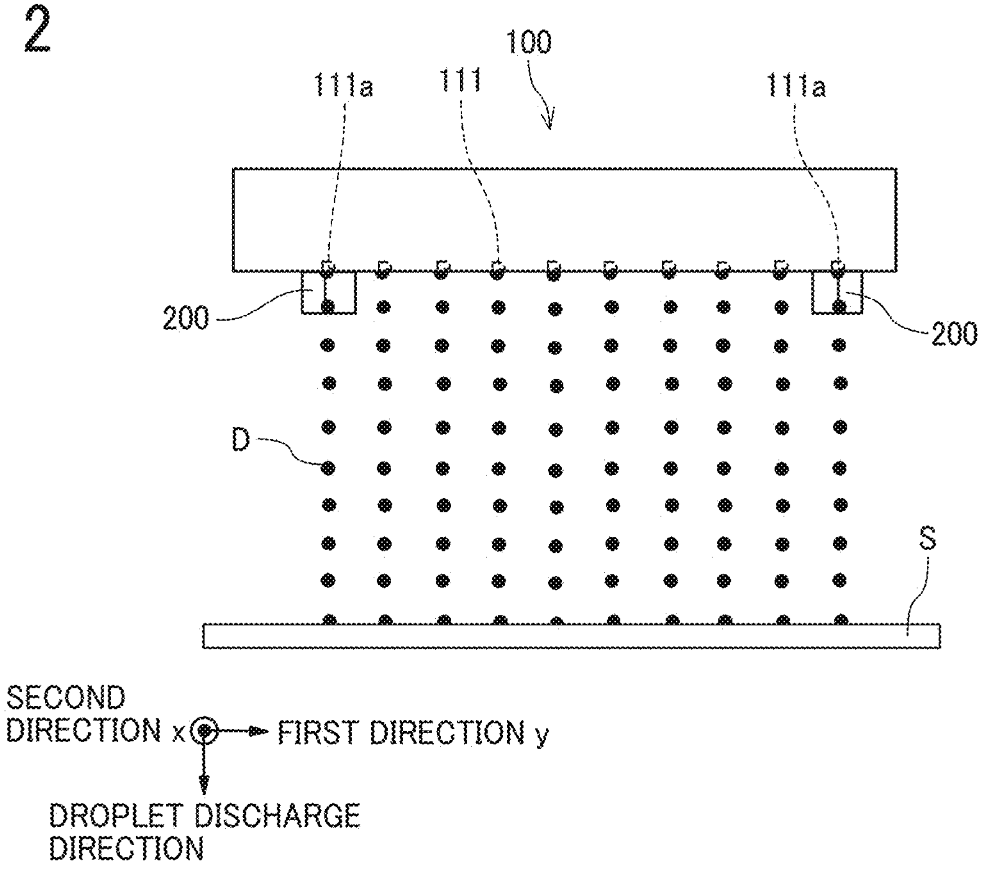
FIG. 2 is a schematic front view of the discharge head of FIG. 1.
Figure 3:
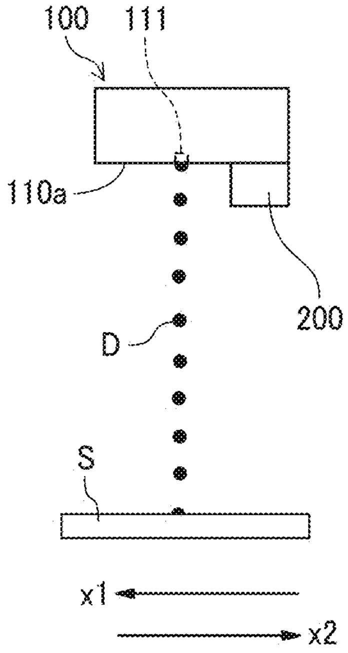
FIG. 3 is a schematic side view of the discharge head of FIG. 1.
Figure 4:
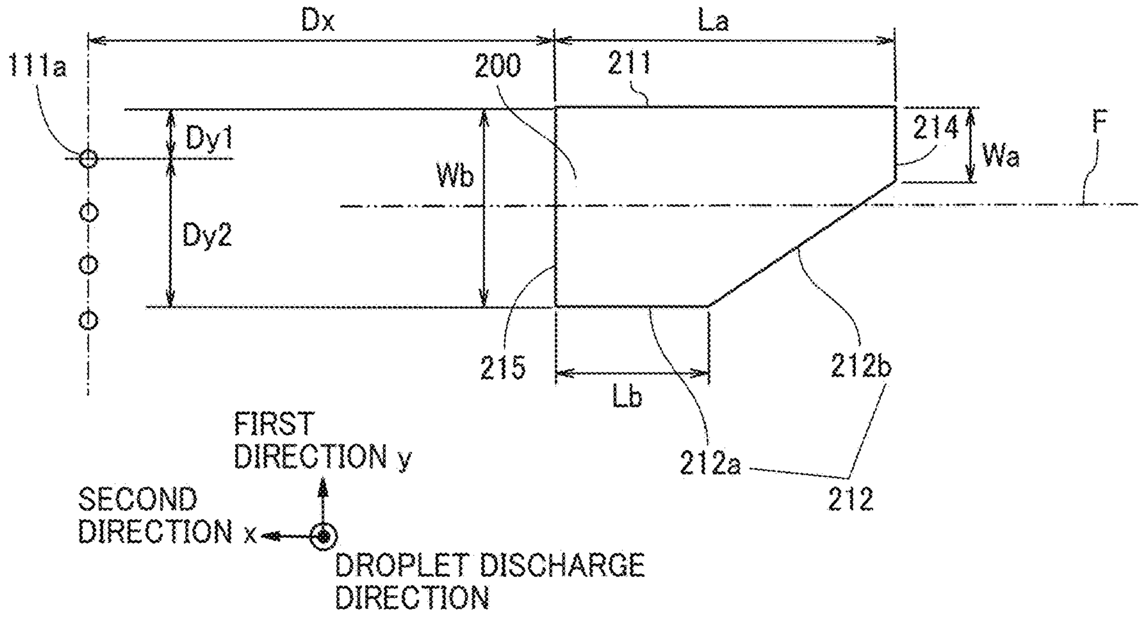
FIG. 4 is an enlarged plan view of a projection of the discharge head of FIG. 1.
Figure 5:
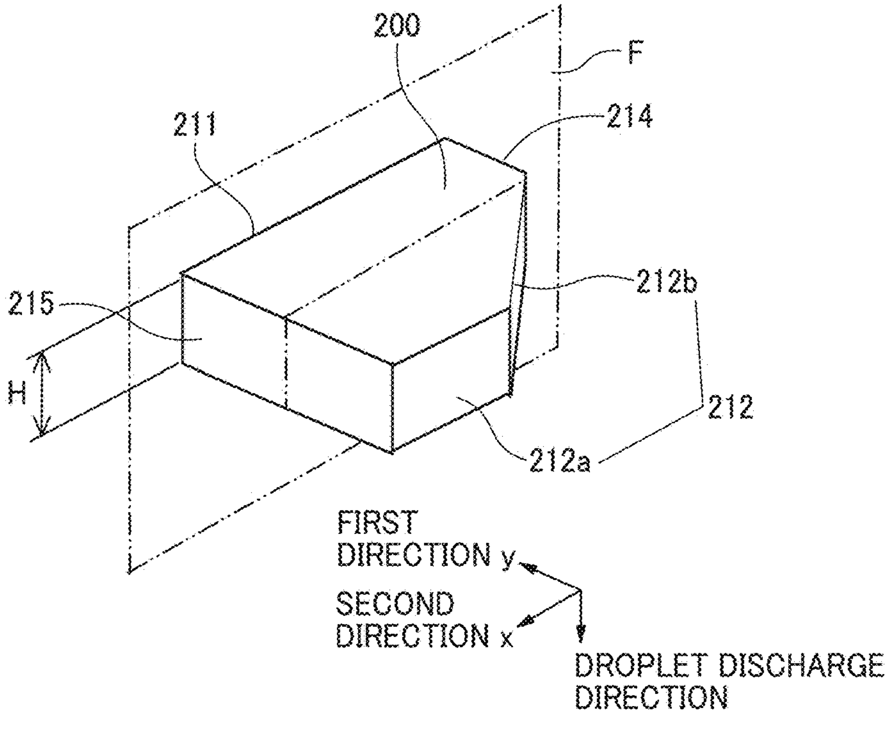
FIG. 5 is a perspective view of the projection of FIG. 4 of the discharge head of FIG. 1.

Embodiments of the present disclosure are described below with reference to the accompanying drawings. A discharge head according to a first embodiment of the present disclosure is described below with reference to FIGS. 1 to 5. FIG. 1 is a schematic plan view of the discharge head according to the first embodiment as viewed from the nozzle face side thereof. FIG. 2 is a schematic front view of the discharge head of FIG. 1. FIG. 3 is a schematic side view of the discharge head of FIG. 1. FIG. 4 is an enlarged plan view of a projection of the discharge head of FIG. 1. FIG. 5 is a perspective view of the projection of FIG. 4 of the discharge head of FIG. 1.

A discharge head 100 according to the first embodiment includes one or multiple nozzle rows 112 and a projection 200. Each nozzle row 112 includes multiple nozzles 111 arrayed in a first direction y on a nozzle face 110*a* (i.e., the surface of a nozzle plate) of the discharge head 100. The discharge head 100 discharges a liquid such as ink from the multiple nozzles 111 in a droplet discharge direction perpendicular to the nozzle face 110*a* (i.e., the surface stretching in the first direction y and a second direction x). The projection 200 projects from the nozzle face 110*a* on which the nozzle row 112 is arrayed.

In the nozzle row 112, a nozzle 111 of the multiple nozzles 111 at each end in the first direction y is referred to as an end nozzle 111*a*.

When a sheet S, which is an object to which liquid is applied, moves relative to the discharge head 100 in the second direction x intersecting the first direction y, the upstream side in the movement direction of the sheet S (i.e., a conveyance direction of sheet S) is defined as "the upstream side in the second direction x."

In other words, the "upstream side in the second direction x" means the upstream side in the movement direction of the sheet S (i.e., the conveyance direction of the sheet S) when the discharge head 100 and the sheet S move relative to each other. In the present embodiment, the sheet S is an object to which liquid is applied (may be referred to as an application target).

As illustrated in FIG. 3, when the sheet S (i.e., the object to which liquid is applied) moves in an x1 direction of the second direction x relative to the fixed discharge head 100, the projection 200 is positioned on the upstream side of the nozzle row 112 in the x1 direction.

On the other hand, when the discharge head 100 moves in an x2 direction of the second direction x relative to the sheet S, the projection 200 is positioned on the downstream side in the x2 direction relative to the nozzle row 112. At this time, in the relative movement direction of the discharge head 100 and the sheet S, the sheet S seems to be conveyed in the x1 direction. Accordingly, the projection 200 is positioned on the upstream side of the nozzle row 112 in the relative movement direction of the sheet S relative to the discharge head 100.

As described above, the discharge head 100 includes the projection 200 on the upstream side in the second direction x relative to the nozzle row 112. As a result, the airflow generated by the movement of the sheet S hits the projection 200 and flows along both sides of the projection 200 to form vortexes wrapping around the projection 200.

The projection 200 is disposed on the upstream side in the second direction x relative to each of both end nozzles 111*a* in the nozzle row 112. In the present embodiment, the projections 200 are disposed corresponding to both of the end nozzles 111*a*, but the projection 200 may be disposed on the upstream side in the second direction x relative to one of the end nozzles 111*a* in the nozzle row 112.

The projection 200 has a first sidewall 211 located outside the end nozzle 111*a* and a second sidewall 212 located inside the end nozzle 111*a* in the first direction y.

In the present embodiment, when the projections 200 having the same shape are arranged corresponding to the end nozzles 111*a* on both sides of the nozzle row 112, the projections 200 on both sides are opposite to each other in the first direction y (i.e., line symmetry) in plan view (i.e., as viewed in the direction perpendicular to the nozzle face 110*a*). Alternatively, when the projections 200 are arranged corresponding to the end nozzles 111*a* on both sides of the nozzle row 112, the projections 200 may have different shapes.

The first sidewall 211 and the second sidewall 212 of the projection 200 are asymmetric with respect to a reference plane F parallel to the second direction x and perpendicular to the nozzle face 110*a*. The reference plane F is a plane parallel to the second direction x and passing through the center of the width of the projection 200 in the first direction y (the center of the length between the outermost position and the innermost position of the projection 200 in the first direction y). Since the reference plane F as a reference is perpendicular to the nozzle face 110*a*, the first sidewall 211 and the second sidewall 212 having the same shape in plan view may stand at different angles with respect to the direction perpendicular to the nozzle face 110*a*.

In the present embodiment, both the first sidewall 211 and the second sidewall 212 of the projection 200 stand straight in the direction perpendicular to the nozzle face 110*a*. The entire first sidewall 211 (i.e., a first face) extends in the second direction x in plan view (i.e., as viewed in the direction perpendicular to the nozzle face 110*a*). The second sidewall 212 has a wall face 212*a* (i.e., a third face) extending in the second direction x and a slanted face 212*b* (i.e., a second face) connected to the wall face 212*a* on the upstream side in the second direction x. The slanted face 212*b* is slanted with respect to the second direction x toward the first sidewall 211 in plan view (i.e., as viewed in the direction perpendicular to the nozzle face 110*a*).

A length La of the first sidewall 211 extending in the second direction x is longer than a length Lb of the wall face 212*a* of the second sidewall 212 extending in the second direction x.

The second sidewall 212 of the projection 200 has the slanted face 212*b*. Accordingly, a width Wa in the first direction y of an upstream face 214 in the second direction x of the projection 200 is shorter than a width Wb in the first direction y of a downstream face 215 downstream from the upstream face 214 in the second direction of the projection 510.

The bending of droplets discharged from end nozzles according to a first comparative example, which is compared with effects of the present embodiment, is described below with reference to FIGS. 6 and 7. FIG. 6 is a schematic front view of a discharge head according to the first comparative example, corresponding to FIG. 2. FIG. 7 is a schematic perspective view of the discharge head of FIG. 6, according to the first comparative example, illustrating droplets that fly and land on a sheet.

As illustrated in FIG. 6, a discharge head 100 according to the first comparative example does not have the projection 200 according to the present embodiment.

When droplets D of liquid are discharged from multiple nozzles 111 of a nozzle row 112 according to the first comparative example (all the nozzles 111 in FIG. 6 for convenience of description), a downward airflow (jet airflow) is generated by the discharged (jetted) droplets D.

At this time, the downward jet airflow and an airflow generated by the conveyance of the sheet S, which is an object to which liquid is applied (i.e., an application target), affect the droplets D discharged from the end nozzles 111*a* of the nozzle row 112 such that the flying direction of the droplets D is bent. In particular, as the conveyance speed of the sheet S increases, the flying direction of the droplets D discharged from the end nozzles 111*a* is bent outward (outward from the nozzle row 112), as illustrated in FIG. 7. As a result, white streaks G as an abnormal image may appear on the sheet S.

Figure 8:
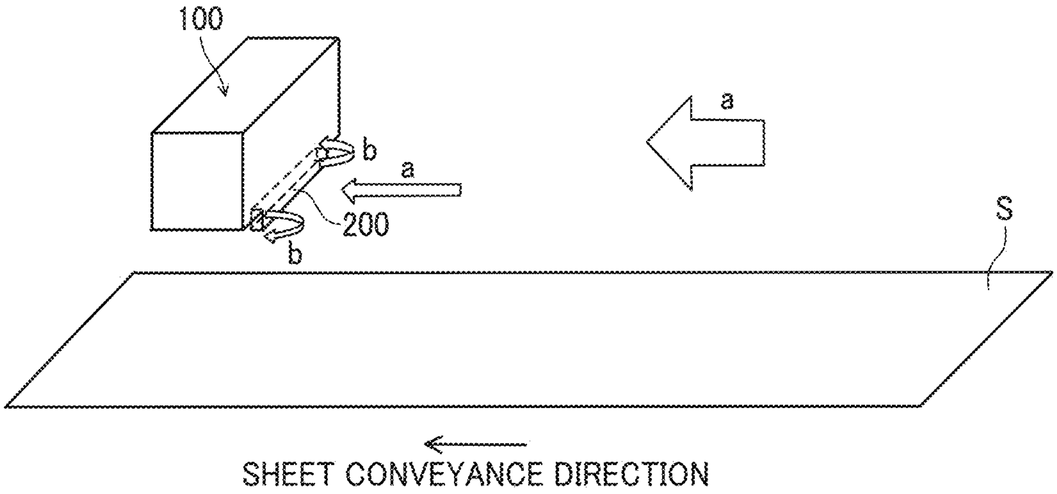
FIG. 8 is a schematic perspective view of a discharge head including a projection projecting from the nozzle face, illustrating an airflow flowing along the projection.

A description is given below of an airflow flowing along a projection projecting from the nozzle face of the discharge head with reference to FIG. 8. FIG. 8 is a schematic perspective view of the discharge head including the projection projecting from the nozzle face, illustrating an airflow flowing around the projection.

In FIG. 8, the projection 200 projecting from the nozzle face 110*a* of the discharge head 100 is disposed at the center portion in the first direction y.

At this time, as the sheet S is conveyed in the conveyance direction of the sheet S, a conveyance airflow a is generated, and the conveyance airflow a collides with the projection 200 of the discharge head 100. Thus, a wraparound airflow b flowing along both sides of the projection 200 is generated. The wraparound airflow b can prevent the flying direction of the droplets discharged from the end nozzle 111*a* from being bent.

In the present embodiment, the bending of the droplets discharged from the discharge head 100 is smaller toward the center portion of the nozzle row 112 and is larger toward the end portion of the nozzle row. When multiple discharge heads 100 are arranged side by side to form a discharge head unit, a joint portion is formed in the discharge head unit. Accordingly, an airflow in a portion closer to the joint portion than to the central portion of the discharge head 100 is preferably corrected.

For this reason, in the present embodiment, as described above, the projection 200 is disposed on the upstream side of the end nozzle 111*a* in the second direction x.

Figure 9A:
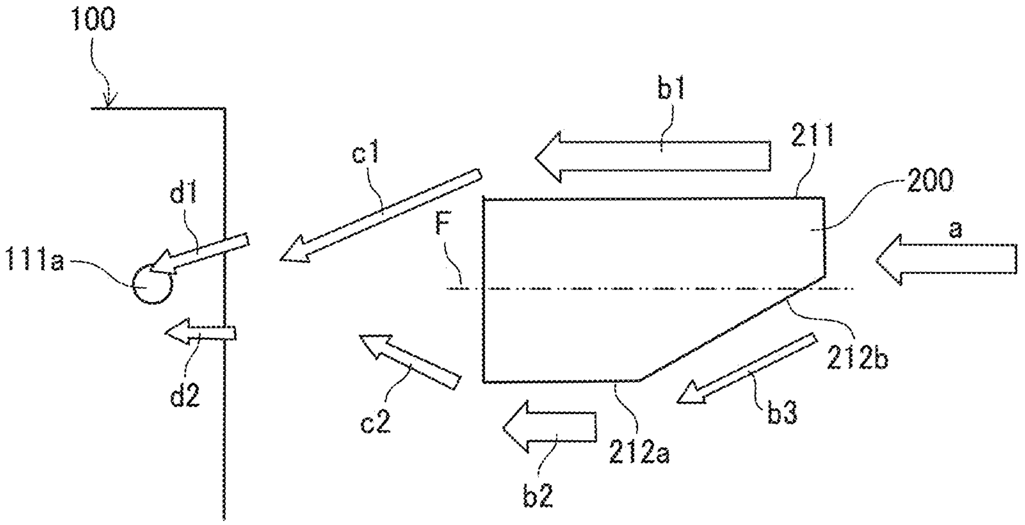
FIGS. 9A and 9B are plan views of the discharge head having the projection of FIG. 4, according to the first embodiment, and a discharge head having a projection, according to a second comparative example, upstream from an end nozzle in a second direction x as viewed from the nozzle face side, respectively, illustrating airflows generated by the respective projections having the different shapes.
Figure 9B:
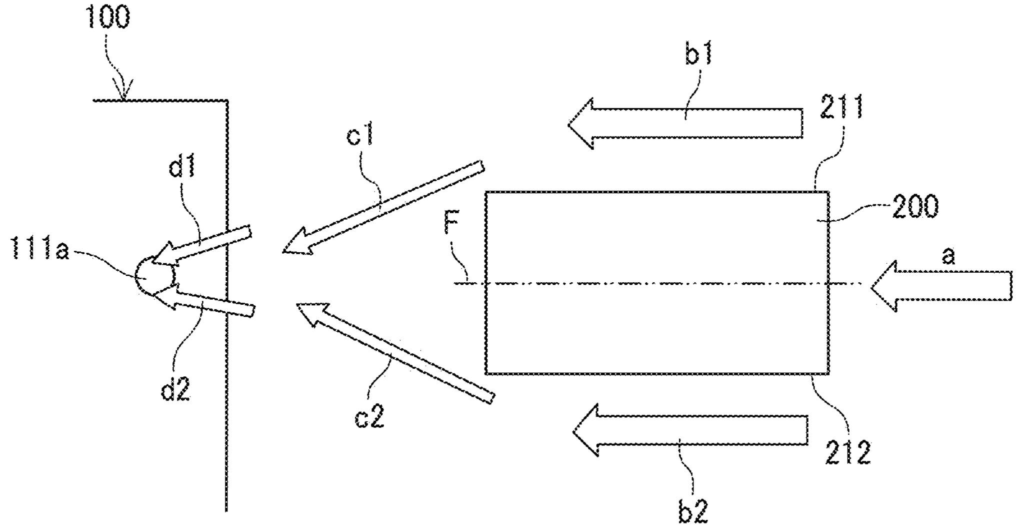
Figure 10:
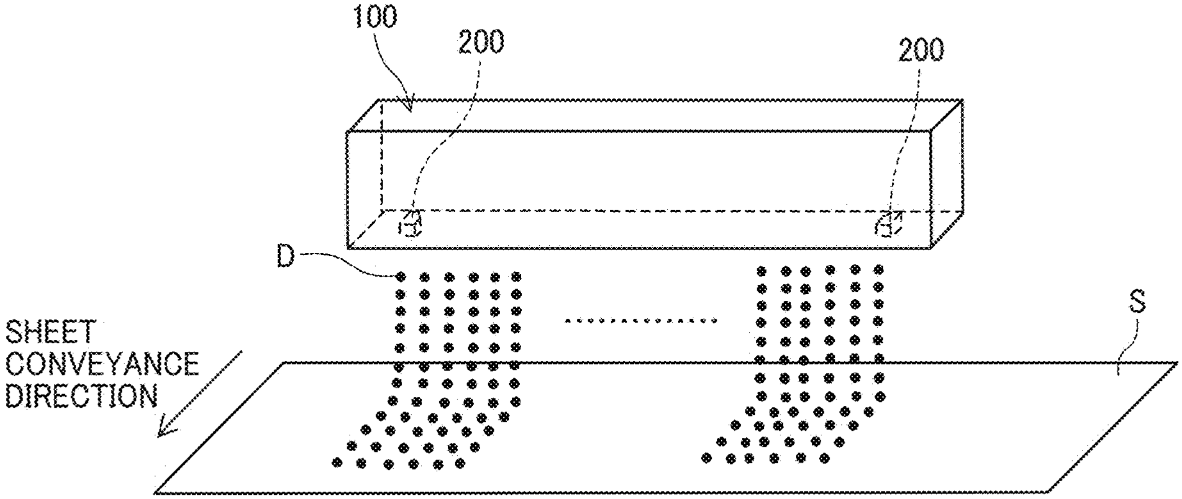
FIG. 10 is a schematic perspective view of the discharge head of FIG. 1 according to the first embodiment, illustrating droplets that land on a sheet.

A description is given below of the discharge head having the projection of FIG. 4, according to the first embodiment, and a discharge head having a projection, according to a second comparative example, upstream from an end nozzle in the second direction x, illustrating airflows generated by the respective projections having the different shapes with reference to FIGS. 9A and 9B and FIG. 10. FIGS. 9A and 9B are plan views of the discharge head having the projection according to the first embodiment, and a discharge head having a projection according to a second comparative example as viewed from the nozzle face side, respectively, illustrating airflows generated by the respective projections. FIG. 10 is a schematic perspective view of the discharge head of FIG. 1 according to the first embodiment, illustrating droplets that land on a sheet.

In the second comparative example, as illustrated in FIG. 9B, the first sidewall 211 and the second sidewall 212 of the projection 200 have a shape symmetrical with respect to the reference plane F parallel to the second direction x and perpendicular to the nozzle face 110*a*, i.e., the same rectangular shape in plan view (as viewed in the first direction y).

In the second comparative example, the airflow a collides with the projection 200, and thus airflows b1 and b2 respectively flowing along the first sidewall 211 and the second sidewall 212 are generated. At this time, since the first sidewall 211 and the second sidewall 212 have the same shape, the airflows b1 and b2 having the same strength are generated, and airflows c1 and c2 having the same strength are generated after passing through the projection 200.

As a result, airflows d1 and d2 reaching the end nozzle 111*a* have the same strength and flow toward the end nozzle 111*a* from both sides. As a result, the airflows d1 and d2 do not correct the bending of the droplets discharged from the end nozzle 111*a*.

By contrast, in the present embodiment, as illustrated in FIG. 9A, the first sidewall 211 and the second sidewall 212 of the projection 200 are asymmetric with respect to the reference plane F parallel to the second direction x and perpendicular to the nozzle face 110*a*.

Accordingly, in the present embodiment, the airflow a collides with the projection 200, and thus the airflow b1 flowing along the first sidewall 211 is generated, and the airflow b2 and an airflow b3 flowing along the second sidewall 212 are generated. At this time, the airflow b2 is weaker than the airflow b1, and the airflow b3 is also generated. An airflow c2 passing through the projection 200 is weaker than an airflow c1 passing through the projection 200.

As a result, the airflow c1 approaching the end nozzle 111*a* turns into a strong airflow d1 diagonally flowing inward from the outside in the first direction y. On the other hand, the airflow c2 approaching the end nozzle 111*a* is less likely to turn into an airflow diagonally flowing outward from the inside, and is likely to turn into an airflow d2 flowing almost straight in the second direction x.

Accordingly, as illustrated in FIG. 10, the droplets D discharged from the end nozzles 111*a* are prevented from being bent outward, and thus the white streaks G described above can be prevented.

As described above, the projection is disposed on the upstream side of the end nozzle in the second direction, the first sidewall and the second sidewall of the projection are asymmetric with respect to the reference plane parallel to the second direction and perpendicular to the nozzle face. As a result, the droplets discharged from the end nozzle of the nozzle row can be prevented from being bent.

A liquid discharge head to which the projection 200 according to the present embodiment is applied is specifically described below.

Liquid Discharge Head

The discharge head 100 includes eight nozzle rows 112 in the second direction x, each of which includes the multiple nozzles 111 arrayed in the first direction y. The multiple nozzles 111 of the nozzle row 112 are arranged at an interval (nozzle pitch) of 338.6 μm in the first direction y, and the interval in the second direction x between the nozzle rows 112 is 338.6 μm. The eight nozzle rows 112 are shifted by 42 μm in the first direction y so that the multiple nozzles are arrayed in a staggered manner so as not to overlap each other in the first direction y. Accordingly, the discharge head 100 can form dots on the sheet S at a pitch of 42 μm (600 dots per inch (dpi)) in the first direction y when the sheet S is conveyed once in the second direction x. In the drawings, a part of the multiple nozzles 111 in the eight nozzle rows 112 is omitted for the sake of simplicity.

Projection

As illustrated in FIG. 1, the discharge head 100 includes the projection 200 disposed on the upstream side of the nozzle row 112 in the second direction x. The projection 200 is disposed on the upstream side, in the second direction x, of the end nozzle 111*a* at both ends, in the first direction y, of the most upstream nozzle row 112 in the second direction x. In the discharge head 100 illustrated in FIG. 4, a distance Dx between the nozzle row 112 and the projection 200 in the second direction x is 5 mm, and an interval Dy1 in the first direction y between the end nozzle 111*a* and the first sidewall 211 is 1.0 mm.

The distance Dx between the nozzle row 112 and the projection 200 in the second direction x is preferably longer than the length La of the first sidewall 211 in the second direction y to cause the airflow flowing from the first sidewall 211 to efficiently affect the end nozzle 111*a*. If the distance Dx is shorter than the length La of the first sidewall 211, the vortex airflow generated on the downstream side of the projection 200 in the second direction x may adversely affect the end nozzle 111*a*.

The interval Dy1 between the first sidewall 211 and the end nozzle 111*a* in the first direction y is preferably in a range of 0.5 to 1.5 mm. In the present embodiment, the interval Dy1 is 1.0 mm. An interval Dy2 in the first direction y between a wall face 212*a* of the second sidewall 212 extending in the second direction x and the end nozzle 111*a* is preferably in the range of 1.5 to 2.5 mm, and is 2.0 mm in the present embodiment. The interval Dy2 is preferably longer than the interval Dy1. The interval Dy2 longer than the interval Dy1 can cause the airflow to efficiently flow inward on the discharge head 100 and reach the end nozzle 111*a*.

In the present embodiment illustrated in FIG. 4, the length La of the first sidewall 211 is 4 mm, the length Lb of the wall face 212*a* of the second sidewall 212 is 2 mm. A width Wa of the projection 200 in the first direction y on the upstream side in the second direction x is 1.5 mm, and a width Wb of the projection 200 in the first direction y on the downstream side in the second direction x is 3 mm. A height H (see FIG. 5) of the side walls of the projection 200 is shorter than the length between the nozzle face 110*a* and the sheet S. In the present embodiment, the length between the nozzle face 110*a* and the sheet S is 3 mm, and the height His 1 mm.

Image Evaluation

Liquid was discharged from the nozzles 111 onto the sheet S using the discharge head 100 including the above-described projections 200 arranged upstream of the end nozzles 111*a* at both ends of the nozzle row 112 to form an image, and the formed image was evaluated. Black ink was used as the liquid, and the liquid was discharged from each nozzle under the conditions of a droplet volume of 8 pico-litter (pl), a droplet speed of 7 m/s, and a discharge frequency of 40 kHz. The sheet S was spaced from the nozzle face 110*a* by 3 mm, and was conveyed from the upstream side to the downstream side in the second direction x at a speed of 1.7 m/s to form an image of 600 dpi×600 dpi on the sheet S. The formed image was visually evaluated, the white streak G as illustrated in FIG. 7 was not visually recognized in the evaluation.

The above-described embodiment is illustrative of the configuration of the projection 200 and the discharge head

100 to be implemented, and embodiments of the present disclosure are not limited to the scope of the above-described embodiment.

Figure 11:
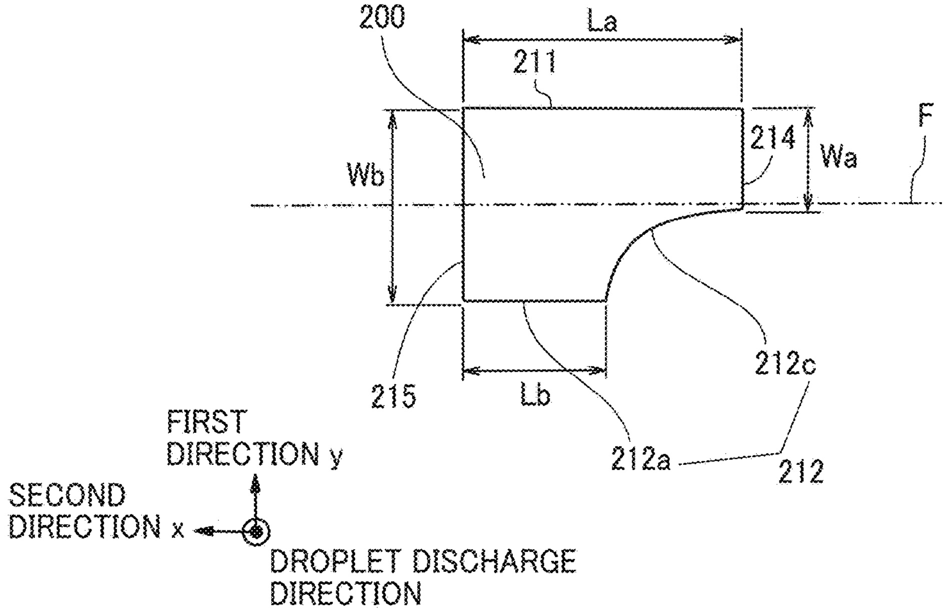
FIG. 11 is a schematic plan view of a projection of a discharge head according to a second embodiment of the present disclosure as viewed from the nozzle face side thereof.

A projection of a discharge head according to a second embodiment of the present disclosure is described below with reference to FIG. 11. FIG. 11 is a schematic plan view of the projection of the discharge head according to the second embodiment as viewed from the nozzle face side thereof.

A projection 200 according to the present embodiment has a first sidewall 211 outside the end nozzle 111*a* and a second sidewall 212 inside the end nozzle 111*a* in the first direction y. The first sidewall 211 and the second sidewall 212 of the projection 200 are asymmetric with respect to the reference plane F parallel to the second direction x and perpendicular to the nozzle face 110*a*.

In the present embodiment, both the first sidewall 211 and the second sidewall 212 of the projection 200 stand straight in the direction perpendicular to the nozzle face 110*a*. The entire first sidewall 211 extends in the second direction x in plan view (i.e., as viewed in the direction perpendicular to the nozzle face 110*a*). The second sidewall 212 has the wall face 212*a* extending in the second direction x and a curved face 212*c* connected to the wall face 212*a* on the upstream side in the second direction x. The curved face 212*c* is curved with respect to the second direction x in plan view (i.e., as viewed in the direction perpendicular to the nozzle face 110*a*).

Even when the projection 200 has such a shape, similarly to the first embodiment, an airflow flowing along the first sidewall 211 and approaching the end nozzle 111*a* turns into a strong airflow diagonally flowing inward from the outside of the nozzle row 112 in the first direction y. On the other hand, an airflow flowing along the second sidewall 212 and approaching the end nozzle 111*a* is less likely to turn into an airflow diagonally flowing outward from the inside, and is likely to turn into an airflow flowing almost straight in the second direction x.

The curved face 212*c*, which is a part of the second sidewall 212, of the projection 200 can further weaken the airflow flowing along the second sidewall 212 as compared with the slanted face 212*b*, which is a part of the second sidewall 212, of the projection 200 according to the first embodiment.

Due to such a configuration, the droplets discharged from the end nozzles 111*a* are prevented from being bent outward.

Figure 12:
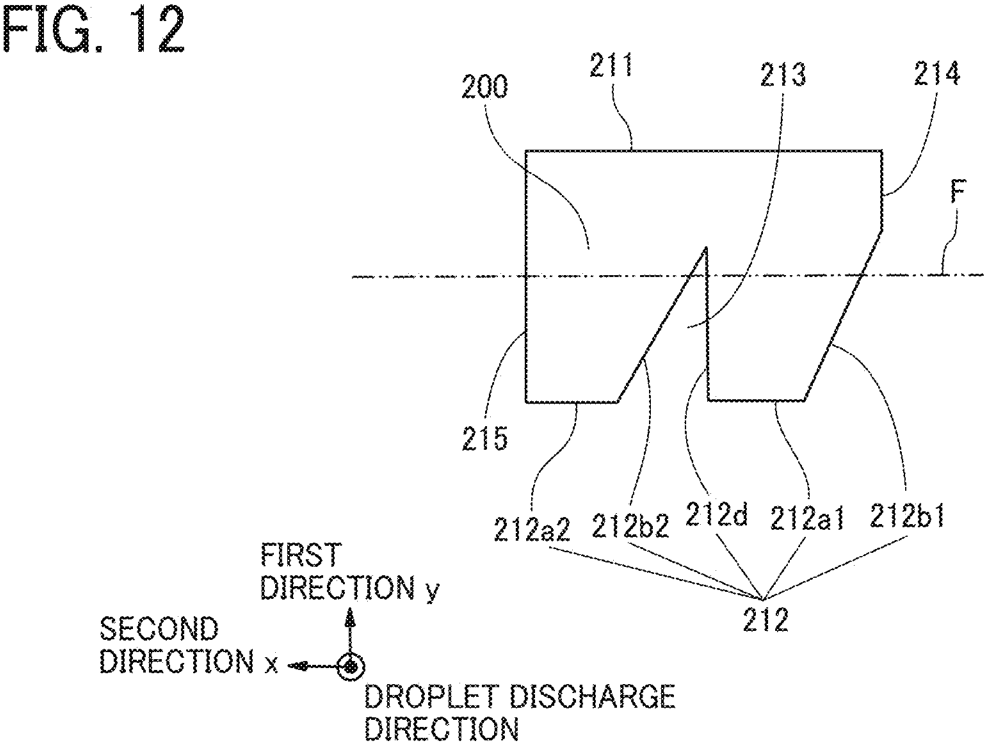
FIG. 12 is a schematic plan view of a projection of a discharge head according to a third embodiment of the present disclosure as viewed from the nozzle face side thereof.

A projection of a discharge head according to a third embodiment of the present disclosure is described below with reference to FIG. 12. FIG. 12 is a schematic plan view of the projection of the discharge head according to the third embodiment as viewed from the nozzle face side thereof.

A projection 200 according to the present embodiment has a first sidewall 211 outside the end nozzle 111*a* and a second sidewall 212 inside the end nozzle 111*a* in the first direction y. The first sidewall 211 and the second sidewall 212 of the projection 200 are asymmetric with respect to the reference plane F parallel to the second direction x and perpendicular to the nozzle face 110*a*.

In the present embodiment, both the first sidewall 211 and the second sidewall 212 of the projection 200 stand straight in the direction perpendicular to the nozzle face 110*a*.

The entire first sidewall 211 extends in the second direction x in plan view (i.e., as viewed in the direction perpendicular to the nozzle face 110*a*). On the other hand, a recess 213 is recessed in the first direction y on the second sidewall 212.

The second sidewall 212 has wall faces 212*al* and 212*a*2 extending in the second direction x, a slanted face 212*b*1 connected to the wall face 212*al* on the upstream side in the second direction x, a slanted face 212*b*2 connected to the wall face 212*a*2 on the upstream side in the second direction x, and a wall face 212*d* extending in the first direction y. The slanted faces 212*b*1 and 212*b*2 are slanted with respect to the second direction x toward the first sidewall 211 in plan view (i.e., as viewed in the direction perpendicular to the nozzle face 110*a*).

Even when the projection 200 has such a shape, similarly to the first embodiment, an airflow flowing along the first sidewall 211 and approaching the end nozzle 111*a* turns into a strong airflow diagonally flowing inward from the outside of the nozzle row 112 in the first direction y. On the other hand, an airflow flowing along the second sidewall 212 and approaching the end nozzle 111*a* is less likely to turn into an airflow diagonally flowing outward from the inside, and is likely to turn into an airflow flowing almost straight in the second direction x.

The recess 213 recessed in the first direction y on the second sidewall 212 of the projection 200, (i.e., the second sidewall 212 having a notch) can further weaken the airflow flowing along the second sidewall 212 as compared with the projection 200 according to the second embodiment.

Due to such a configuration, the droplets discharged from the end nozzles 111*a* are prevented from being bent outward.

Figure 13:
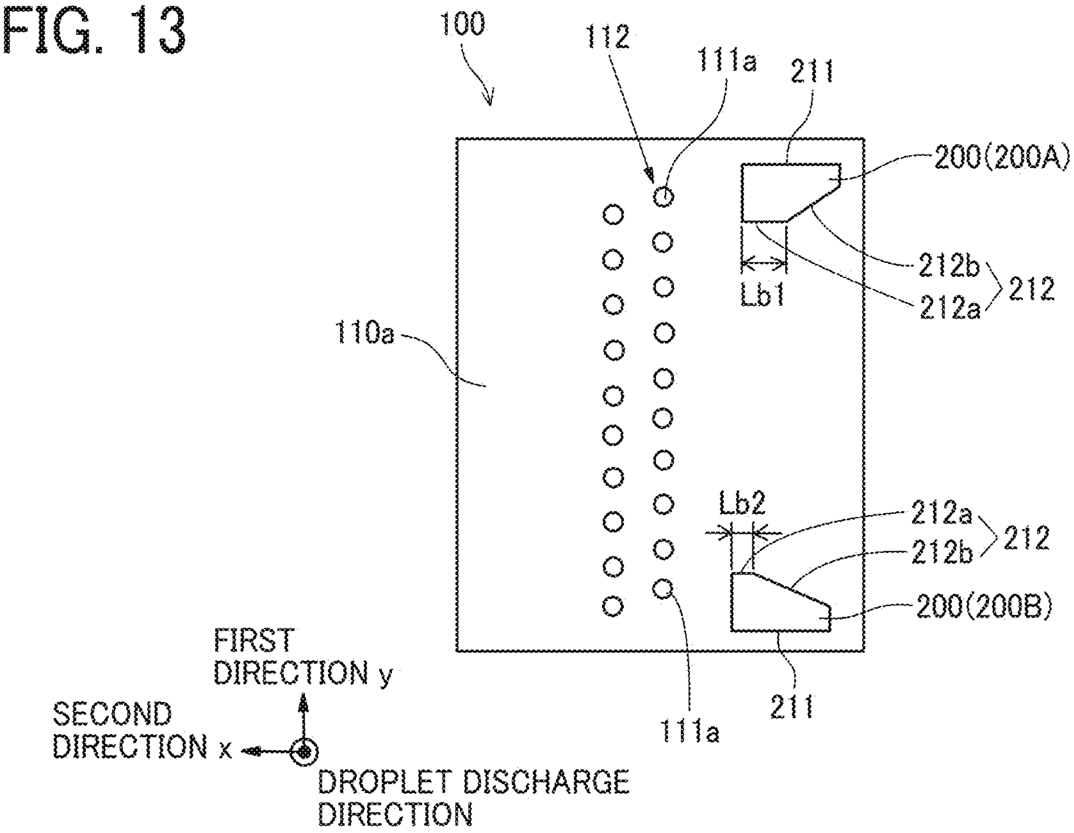
FIG. 13 is a schematic plan view of a discharge head according to a fourth embodiment of the present disclosure as viewed from the nozzle face side thereof.

A discharge head according to a fourth embodiment of the present disclosure is described below with reference to FIG. 13. FIG. 13 is a schematic plan view of the discharge head according to the fourth embodiment as viewed from the nozzle face side thereof.

In the discharge head 100 according to the present embodiment, the projections 200 (200A and 200B) having a similar shape as that of the first embodiment in plan view are disposed on the upstream side in the second direction x of the end nozzles 111*a* at both ends of the nozzle row 112 in the first direction y, respectively.

Lengths Lb1 and Lb2 of the wall face 212*a* of the second sidewall 212 are different between the projection 200A corresponding to one end nozzle 111*a* and the projection 200B corresponding to the other end nozzle 111*a* (i.e., Lb1>Lb2).

The projections 200 can have different shapes according to the degree of bending of the droplets discharged from the end nozzle 111*a* to generate a wraparound airflow suitable to the degree of bending. The lengths of the first sidewalls 211 of the projections 200A and 200B may be different.

Figure 14:
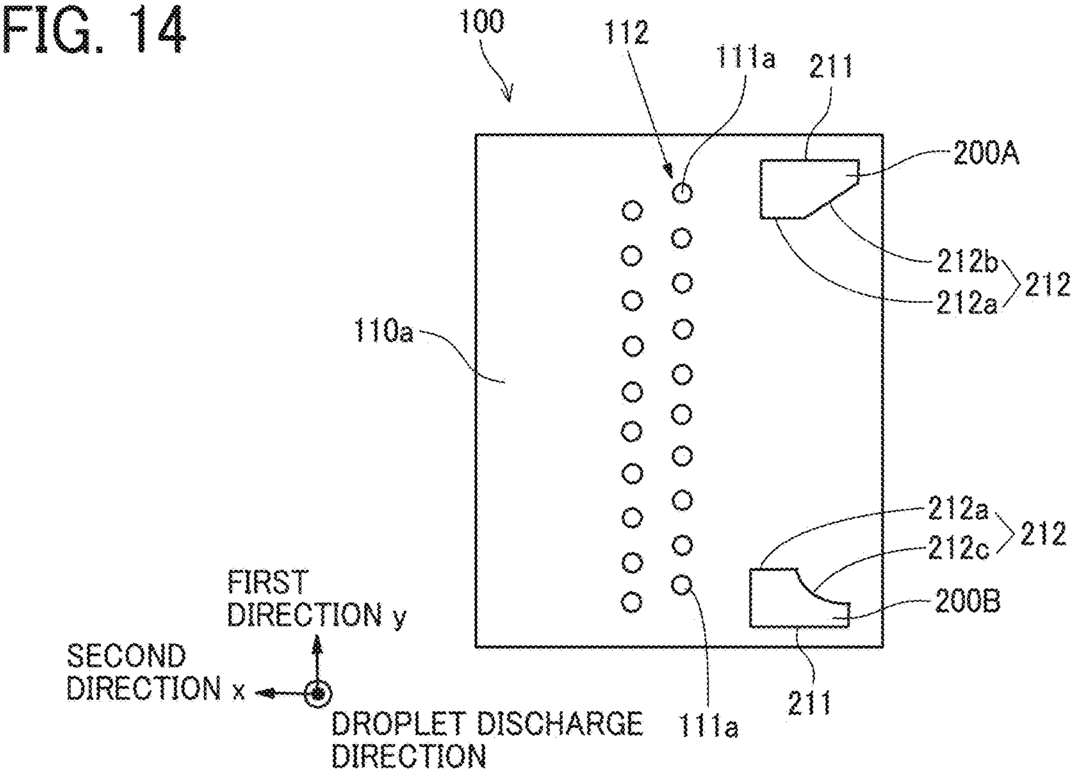
FIG. 14 is a schematic plan view of a discharge head according to a fifth embodiment of the present disclosure as viewed from the nozzle face side thereof.

A discharge head according to a fifth embodiment of the present disclosure is described below with reference to FIG. 14. FIG. 14 is a schematic plan view of the discharge head according to the fifth embodiment as viewed from the nozzle face side thereof.

In the discharge head 100 according to the present embodiment, the projections 200 (200A and 200B) are disposed on the upstream side in the second direction x of the end nozzles 111*a* at both ends of the nozzle row 112 in the first direction y, respectively.

The projection 200A corresponding to one end nozzle 111*a* has the second sidewall 212 having the slanted face 212*b*, similarly to the first embodiment. The projection 200B corresponding to the other end nozzle 111*a* has the second sidewall 212 having the curved face 212*c*, similarly to the second embodiment.

The projections 200 can have different shapes according to the degree of bending of the droplets discharged from the end nozzle 111*a* to generate a wraparound airflow suitable to the degree of bending.

Figure 15:
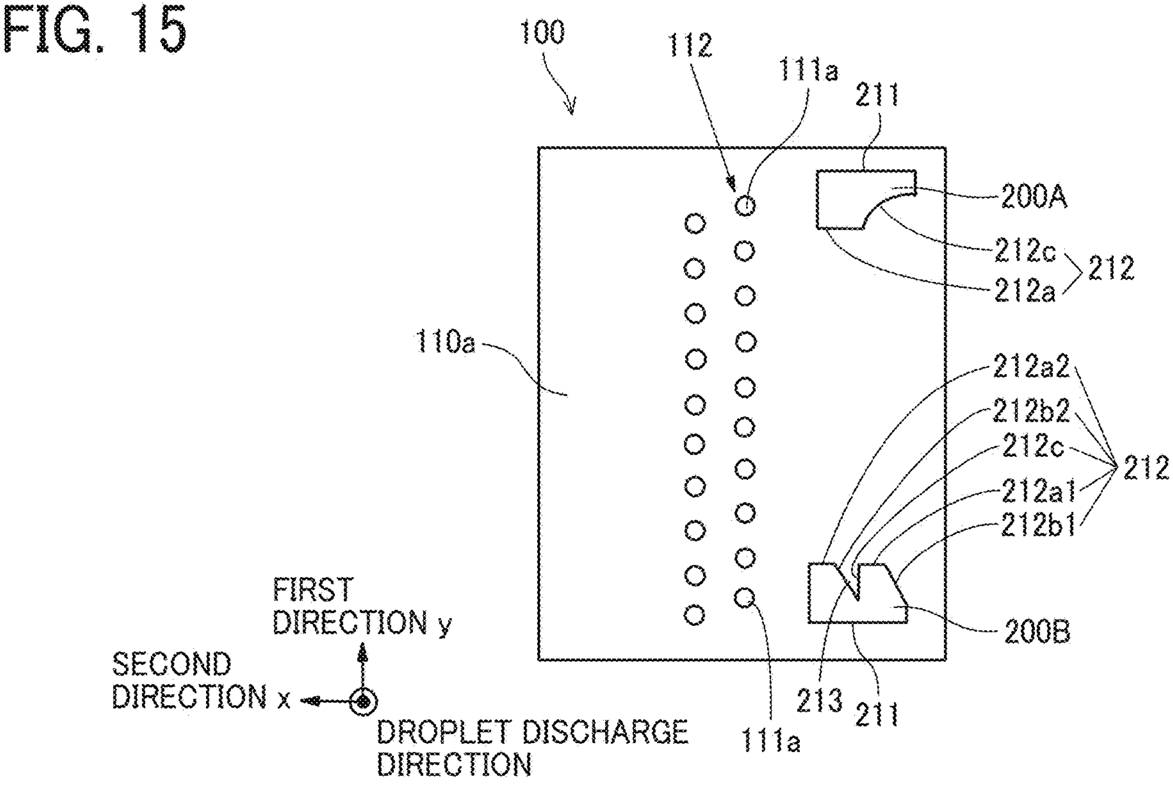
FIG. 15 is a schematic plan view of a discharge head according to a sixth embodiment of the present disclosure as viewed from the nozzle face side thereof.

A discharge head according to a sixth embodiment of the present disclosure is described below with reference to FIG. 15. FIG. 15 is a schematic plan view of the discharge head according to the sixth embodiment as viewed from the nozzle face side thereof.

In the discharge head 100 according to the present embodiment, the projections 200 (200A and 200B) are disposed on the upstream side in the second direction x of the end nozzles 111*a* at both ends of the nozzle row 112 in the first direction y, respectively.

The projection 200A corresponding to one end nozzle 111*a* has the second sidewall 212 having the curved face 212*c*, similarly to the second embodiment. The projection 200B corresponding to the other end nozzle 111*a* has the second sidewall 212 having the recess 213, similarly to the third embodiment.

The projections 200 can have different shapes according to the degree of bending of the droplets discharged from the end nozzle 111*a* to generate a wraparound airflow suitable to the degree of bending.

Figure 16:
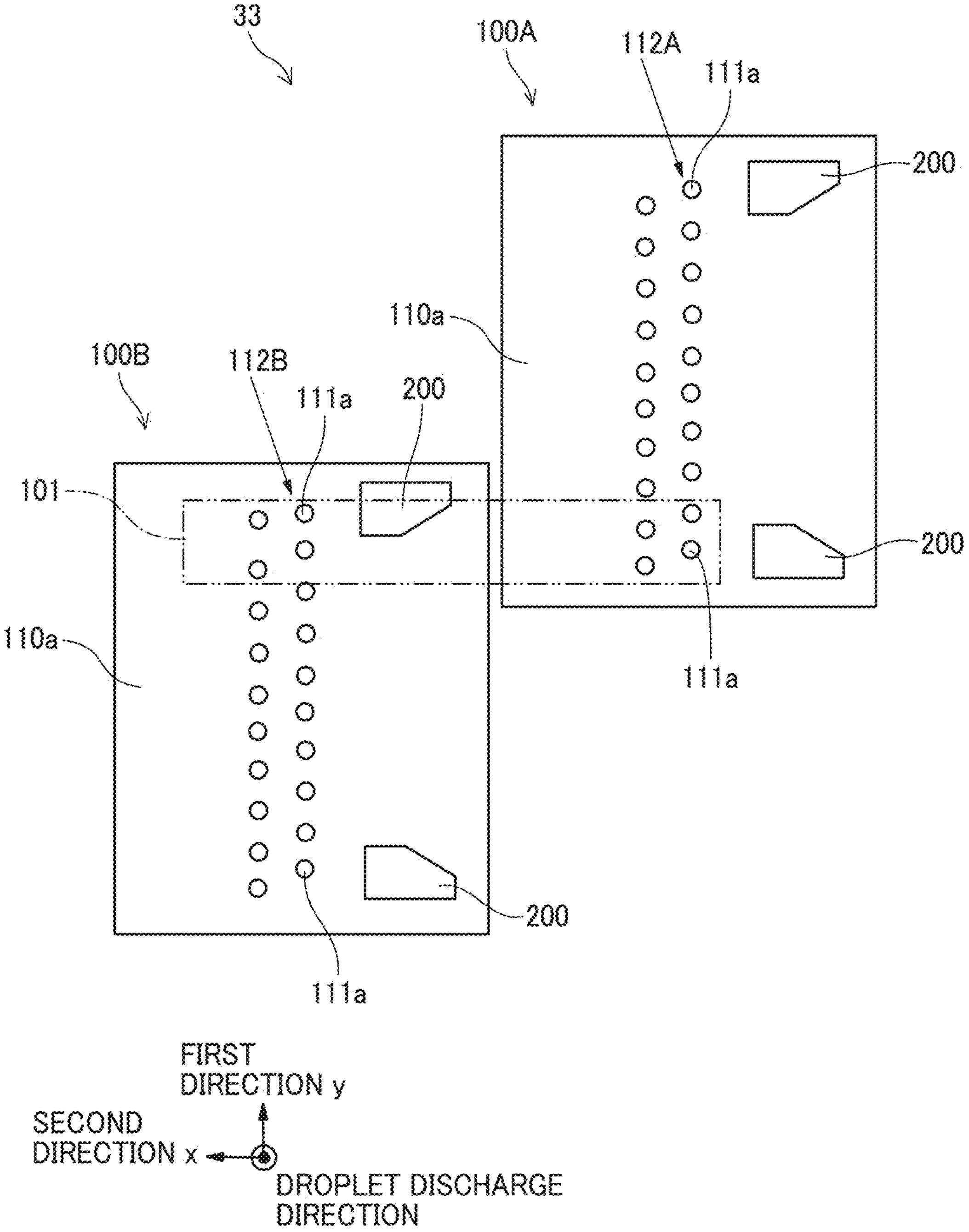
FIG. 16 is a schematic plan view of a discharge head unit according to a seventh embodiment of the present disclosure as viewed from the nozzle face side thereof.

A discharge head unit according to a seventh embodiment of the present disclosure is described below with reference to FIG. 16. FIG. 16 is a schematic plan view of the discharge head unit according to the seventh embodiment as viewed from the nozzle face side thereof.

A discharge head unit 33 according to the seventh embodiment includes multiple discharge heads 100 arranged in a staggered manner in the first direction y. In the present embodiment, a first discharge head 100A and a second discharge head 100B are arranged in a staggered manner in the first direction y.

The first discharge head 100A includes a nozzle row 112A in which multiple nozzles 111 from which liquid is discharged are arrayed in the first direction y. The second discharge head 100B includes a nozzle row 112B in which multiple nozzles 111 from which liquid is discharged are arrayed in the first direction y.

In the present embodiment, the discharge head 100 moves relative to an application target (sheet S) in the second direction x intersecting the first direction y. In other words, the discharge head 100 may move toward the application target (sheet S) in the negative second direction x, or the application target may be conveyed toward the discharge head 100 in the positive second direction x (i.e., the conveyance direction) in FIG. 16.

At this time, the first discharge head 100A and the second discharge head 100B are arranged in the first direction y at positions shifted in the second direction x so that at least one of the multiple nozzles 111 at an end of the nozzle row 112A of the first discharge head 100A overlaps with at least one of the multiple nozzles 111 at an end of the nozzle row 112B of the second discharge head 100B in the first direction y as viewed in the second direction x. A portion where the nozzles 111 of the nozzle row 112A of the first discharge head 100A and the nozzles 111 of the nozzle row 112B of the second discharge head 100B overlap with each other is defined as a joint portion 101.

Similarly to the above-described embodiments, the upstream side in the relative movement direction of the application target (sheet S) is the upstream side in the second direction x.

In the first discharge head 100A, a projection 200 projecting from the nozzle face 110*a* is disposed on the upstream side, in the second direction x, of the end nozzle 111*a* at one end of the nozzle row 112A in the joint portion 101. In the present embodiment, another projection 200 is also disposed on the upstream side, in the second direction x, of the end nozzle 111*a* at the other end opposite the joint portion 101.

In the second discharge head 100B, a projection 200 projecting from the nozzle face 110*a* is disposed on the upstream side, in the second direction x, of the end nozzle 111*a* at one end of the nozzle row 112A in the joint portion 101. In the present embodiment, another projection 200 is also disposed on the upstream side, in the second direction x, of the end nozzle 111*a* at the other end opposite the joint portion 101.

In this case, the projection 200 of the first discharge head 100A and the projection 200 of the second discharge head 100B in the joint portion 101 are opposite to each other in the first direction y. This is because, in the joint portion 101, the droplets discharged from the end nozzle 111*a* of the first discharge head 100A and the droplets discharged from the end nozzle 111*a* of the second discharge head 100B are bent in the opposite directions.

In each of the projections 200, similarly to the projection 200 described in the first embodiment, the first sidewall 211 and the second sidewall 212 are asymmetric with respect to the reference plane parallel to the second direction x and perpendicular to the nozzle face 110*a*. The projection 200 of the first discharge head 100A and the projection 200 of the second discharge head 100B may have different shapes.

According to the present embodiment, the droplets discharged from the end nozzle 111*a* in the joint portion 101 between the first discharge head 100A and the second discharge head 100B are prevented from being bent outward. If the droplets discharged from the end nozzles 111*a* in the joint portion 101 between the first discharge head 100A and the second discharge head 100B are both bent outward, the white streaks become conspicuous at the position on the application target (sheet S) corresponding to the joint portion 101. As described above, the outward bending of the droplets in the joint portion 101 between the first discharge head 100A and the second discharge head 100B can be prevented, and thus the white streaks can be prevented.

The shape of the projection 200 is not limited to the shape according to the first embodiment, and may be the shape according to the second embodiment or the third embodiment. Further, the projections 200 at both ends may have different shapes as in the fourth embodiment to the sixth embodiment. The number of the discharge heads to be arranged is not limited to two, and three or more discharge heads may be arranged.

Figure 17:
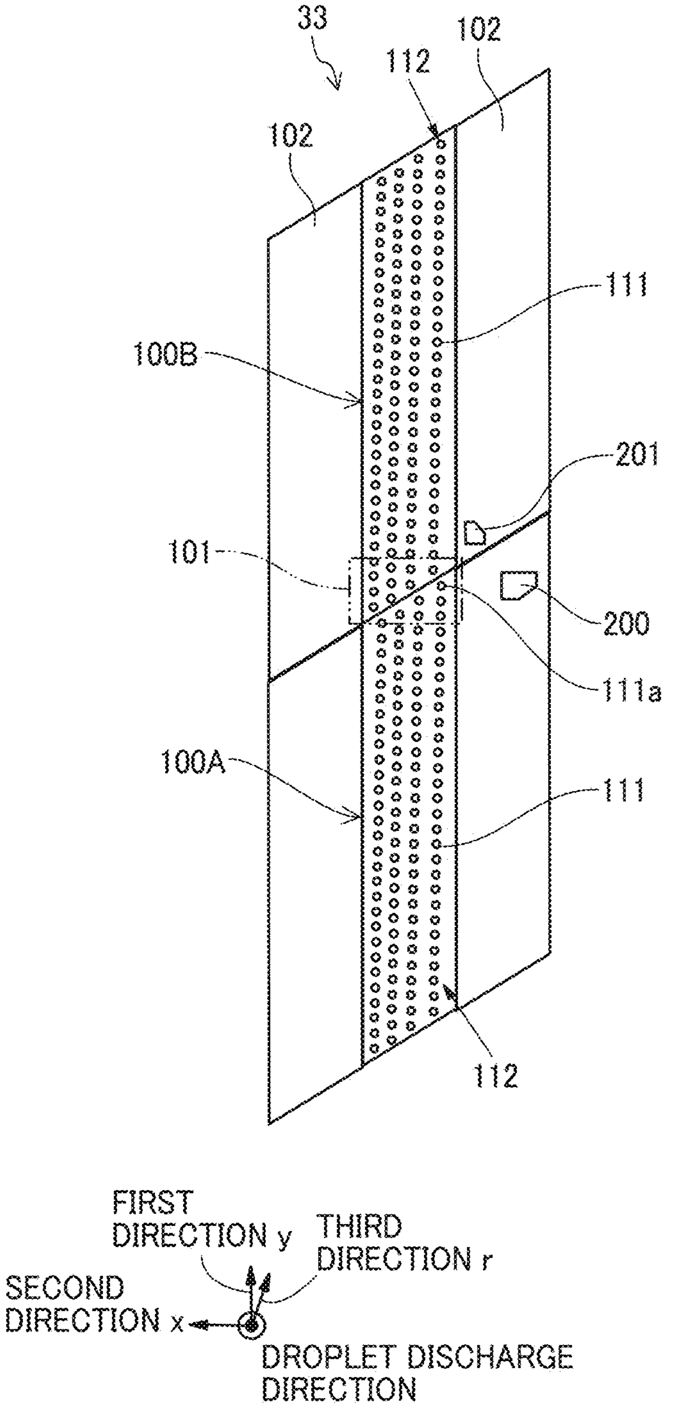
FIG. 17 is a schematic plan view of a discharge head unit according to an eighth embodiment of the present disclosure as viewed from the nozzle face side thereof.

A discharge head unit according to an eighth embodiment of the present disclosure is described below with reference to FIG. 17. FIG. 17 is a schematic plan view of the discharge head unit according to the eighth embodiment as viewed from the nozzle face side thereof.

A discharge head unit 33 according to the eighth embodiment includes multiple discharge heads 100 (100A and 100B) held by the corresponding holders 102 and arranged in the first direction y. In the present embodiment, the first discharge head 100A and the second discharge head 100B are arranged in the first direction y at the same position in the second direction described later.

The first discharge head 100A has multiple (four in the present embodiment) nozzle rows 112 in each of which multiple nozzles 111 are arrayed in a third direction r intersecting the first direction y. The second discharge head 100B has multiple (four in the present embodiment) nozzle rows 112 in each of which multiple nozzles 111 are arrayed in the third direction r intersecting the first direction y. The third direction r, which is the direction of the nozzle rows 112 (i.e., the nozzle row direction) of the discharge heads 100A and 100B, is inclined with respect to the first direction y, which is the arrangement direction of the discharge heads 100A and 100B.

In the present embodiment, the discharge head unit 33 moves relative to an application target (sheet S) in the second direction x intersecting the first direction y. In other words, the discharge head unit 33 may move toward the application target (sheet S) in the negative second direction x, or the application target may be conveyed toward the discharge head unit 33 in the positive second direction x (i.e., the conveyance direction) in FIG. 17.

At this time, at least one of the multiple nozzles 111 of the nozzle row 112 of the first discharge head 100A overlaps with at least one of the multiple nozzles 111 of the nozzle row 112 of the second discharge head 100B in the first direction y as viewed in the second direction x. A portion where the nozzles 111 of the nozzle row 112 of the first discharge head 100A and the nozzles 111 of the nozzle row 112 of the second discharge head 100B overlap with each other is defined as the joint portion 101.

The upstream side in the relative movement direction of the application target (sheet S) is the upstream side in the second direction x.

At this time, among the nozzles 111 of the most upstream nozzle row 112 of the first discharge head 100A in the second direction x, the end nozzle 111*a* in the joint portion 101 where the nozzles 111 of the first discharge head 100A and the second discharge head B overlap is disposed on the most upstream side in the second direction x.

The projection 200 projecting from the nozzle face 110*a* is disposed on the upstream side of the end nozzle 111*a*, which is disposed on the most upstream side in the second direction x in the first discharge head 100A, in the second direction x.

In the projection 200, similarly to the projection 200 described in the first embodiment, the first sidewall 211 and the second sidewall 212 are asymmetric with respect to the reference plane parallel to the second direction x and perpendicular to the nozzle face 110*a*.

In the present embodiment, among the first discharge head 100A and the second discharge head 100B which are two adjacent discharge heads, the discharge head other than the first discharge head 100A including the end nozzle 111*a* disposed on the most upstream side in the second direction x is the second discharge head 100B.

An auxiliary projection 201 (i.e., another projection) projecting from the nozzle face 110*a* is disposed on the upstream side of the most upstream nozzle row 112 of the second discharge head 100B in the second direction x in the joint portion 101.

The auxiliary projection 201 may have the same shape as the projection 200 (but different dimensions), or may have a different shape from the projection 200.

According to the present embodiment, the droplets discharged from the end nozzle 111*a* in the joint portion 101 between the first discharge head 100A and the second discharge head 100B are prevented from being bent outward. The auxiliary projection 201 can more effectively prevent the bending of droplets discharged from the end nozzle 111*a* in the discharge head 100B which does not include the projection 200.

In this case, the projection 200 of the first discharge head 100A having the end nozzle 111*a* from which droplets are discharged first is relatively larger than the auxiliary projection 201 to strengthen the airflow that prevents the bending of droplets. On the other hand, since the bending of droplets is relatively small in the second discharge head 100B having the nozzle 111 from which droplets are discharged subsequently, the auxiliary projection 201 smaller than the projection 200 can prevent the bending of droplets.

The shapes of the projection 200 and the auxiliary projection 201 are not limited to the shape according to the first embodiment, and may be the shape according to the second embodiment or the third embodiment. The number of the discharge heads to be arranged is not limited to two, and three or more discharge heads may be arranged.

Figure 18:
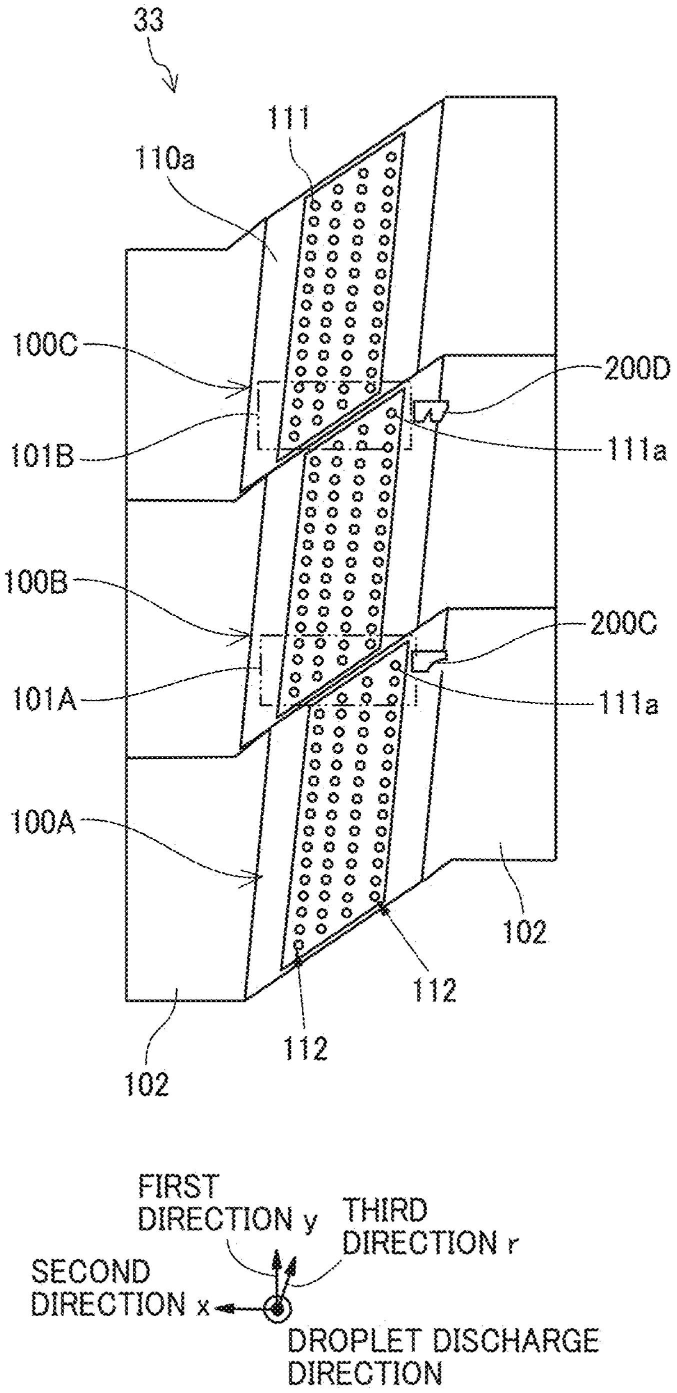
FIG. 18 is a schematic plan view of a discharge head unit according to a ninth embodiment of the present disclosure as viewed from the nozzle face side thereof.

A discharge head unit according to a ninth embodiment of the present disclosure is described below with reference to FIG. 18. FIG. 18 is a schematic plan view of the discharge head unit according to the ninth embodiment as viewed from the nozzle face side thereof.

A discharge head unit 33 according to the ninth embodiment includes multiple discharge heads 100 (100A, 100B, and 100C) held by the corresponding holders 102 and arranged in the first direction y at positions shifted in the second direction x, which is described later. In the present embodiment, the first discharge head 100A, the second discharge head 100B, and the third discharge head 100C are arranged in the first direction y at the positions sequentially shifted to the downstream side in the second direction x.

The first discharge head 100A has multiple (four in the present embodiment) nozzle rows 112 in each of which multiple nozzles 111 are arrayed in a third direction r intersecting the first direction y. The second discharge head 100B has multiple (four in the present embodiment) nozzle rows 112 in each of which multiple nozzles 111 are arrayed in the third direction r intersecting the first direction y. The third discharge head 100C has multiple (four in the present embodiment) nozzle rows 112 in each of which multiple nozzles 111 are arrayed in the third direction r intersecting the first direction y. The third direction r, which is the direction of the nozzle rows 112 (i.e., the nozzle row direction) of the discharge heads 100A, 100B, and 100C, is inclined with respect to the first direction y, which is the arrangement direction of the discharge heads 100A, 100B, and 100C.

In the present embodiment, the discharge head unit 33 moves relative to an application target (sheet S) in the second direction x intersecting the first direction y. In other words, the discharge head unit 33 may move toward the application target (sheet S) in the negative second direction x, or the application target may be conveyed toward the discharge head unit 33 in the positive second direction x (i.e., the conveyance direction) in FIG. 18.

At this time, the first discharge head 100A, the second discharge head 100B, and the third discharge head 100C are arranged at the positions sequentially shifted to the downstream side in the second direction x as described above. In the present embodiment, the first discharge head 100A is disposed on the most upstream side in the second direction x, the second discharge head 100B is disposed on the downstream side of the first discharge head 100A in the second direction x, and the third discharge head 100C is disposed on the downstream side of the second discharge head 100B in the second direction x.

At least one of the multiple nozzles 111 of the nozzle row 112 of the first discharge head 100A overlaps with at least one of the multiple nozzles 111 of the nozzle row 112 of the second discharge head 100B in the first direction y as viewed in the second direction x. Similarly, at least one of the multiple nozzles 111 of the nozzle row 112 of the second discharge head 100B overlaps with at least one of the multiple nozzles 111 of the nozzle row 112 of the third discharge head 100C in the first direction y as viewed in the second direction x. A portion where the nozzles 111 of the nozzle row 112 of the first discharge head 100A and the nozzles 111 of the nozzle row 112 of the second discharge head 100B overlap with each other is defined as a joint portion 101A. A portion where the nozzles 111 of the nozzle row 112 of the second discharge head 100B and the nozzles 111 of the nozzle row 112 of the third discharge head 100C overlap with each other is defined as a joint portion 101B.

The upstream side in the relative movement direction of the application target (sheet S) is the upstream side in the second direction x.

At this time, between the first discharge head 100A and the second discharge head 100B which are two discharge heads adjacent to each other in the first direction y, among the nozzles 111 of the most upstream nozzle row 112 in the second direction x in the first discharge head 100A disposed on the most upstream side in the second direction x, the end nozzle 111*a* in the joint portion 101A where the nozzles 111 of the first discharge head 100A and the second discharge head 100B overlap is disposed on the most upstream side in the second direction x.

The projection 200 (200C) projecting from the nozzle face 110*a* is disposed on the upstream side of the end nozzle 111*a*, which is disposed on the most upstream side in the second direction x in the first discharge head 100A, in the second direction x.

In the projection 200C, similarly to the projection 200 described in the second embodiment, the first sidewall 211 and the second sidewall 212 are asymmetric with respect to the reference plane parallel to the second direction x and perpendicular to the nozzle face 110*a*, and the second sidewall 212 has the curved face 212*c*.

In addition, between the second discharge head 100B and the third discharge head 100C which are two discharge heads adjacent to each other in the first direction y, among the nozzles 111 of the most upstream nozzle row 112 in the second direction x in the second discharge head 100B disposed second from the upstream side in the second direction x, the end nozzle 111*a* in the joint portion 101B where the nozzles 111 of the second discharge head 100B and the third discharge head 100C overlap is disposed on the most upstream side in the second direction x.

The projection 200 (200D) projecting from the nozzle face 110*a* is disposed on the upstream side of the end nozzle 111*a*, which is disposed on the most upstream side in the second direction x in the second discharge head 100B, in the second direction x.

In the projection 200D, similarly to the projection 200 described in the third embodiment, the first sidewall 211 and the second sidewall 212 are asymmetric with respect to the reference plane parallel to the second direction x and perpendicular to the nozzle face 110*a*, and the second sidewall 212 has the recess 213 (notch).

According to the present embodiment, the droplets discharged from the end nozzles 111*a* in the joint portion 101A between the first discharge head 100A and the second discharge head 100B and in the joint portion 101B between the second discharge head 100B and the third discharge head 100C are prevented from being bent outward.

The shapes of the projections 200C and 200D are not limited to the shapes according to the second embodiment and the third embodiment, and may be the shape according to the first embodiment. The number of the discharge heads to be arranged is not limited to three, and two, four, or more than four discharge heads may be arranged.

Figure 19:
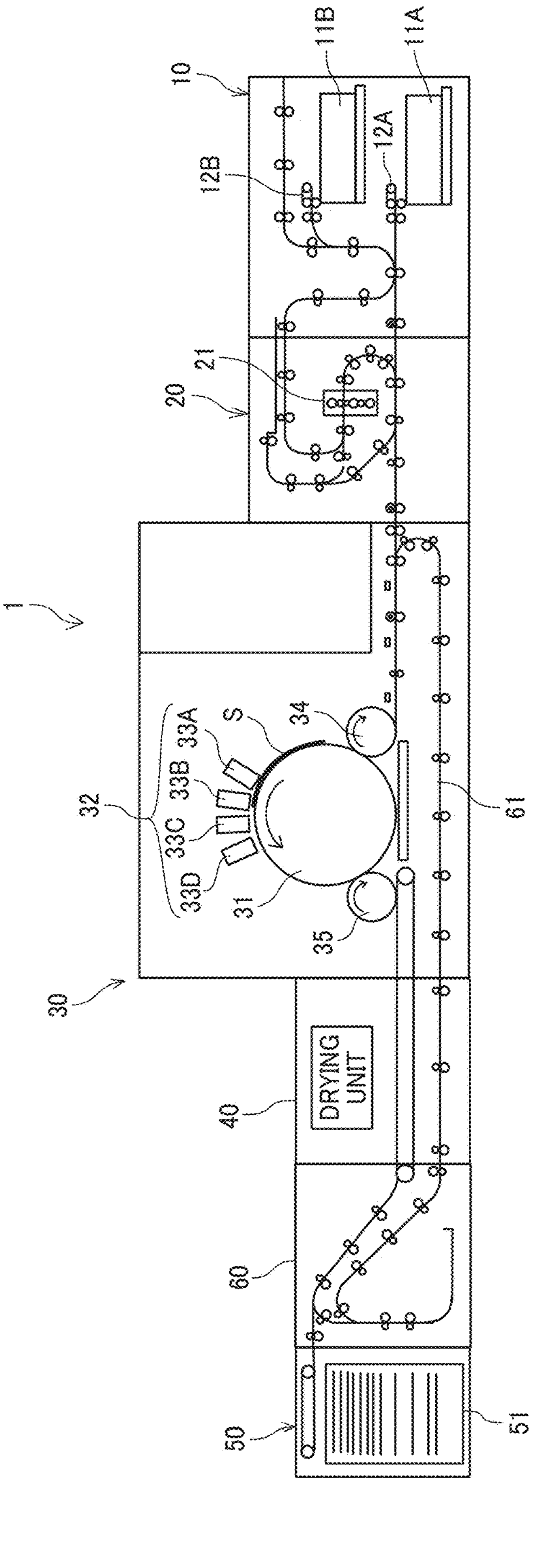
FIG. 19 is a schematic view of a printer as a discharge apparatus according to a tenth embodiment of the present disclosure.

A discharge apparatus according to a tenth embodiment of the present disclosure is described below with reference to FIG. 19. FIG. 19 is a schematic view of the discharge apparatus according to the tenth embodiment.

A printer 1 as the discharge apparatus according to the tenth embodiment includes a loading unit 10 to load a sheet S into the printer 1, a pretreatment unit 20, a printing unit 30, a drying unit 40, a reverse unit 60, and an ejection unit 50.

In the printer 1, the pretreatment unit 20 applies, if desired, a pretreatment liquid onto the sheet S forwarded (supplied) from the loading unit 10, the printing unit 30 applies a liquid (e.g., ink) to the sheet S to perform desired printing, the drying unit 40 dries the liquid adhering to the sheet S, and the sheet S is ejected to the ejection unit 50.

The loading unit 10 includes a lower loading tray 11A and an upper loading tray 11B to accommodate multiple sheets S and feeding units 12A and 12B to separate and forward the sheets S one by one from the lower and upper loading trays 11A and 11B, and supplies the sheets S to the pretreatment unit 20.

The pretreatment unit 20 includes, e.g., a coater 21 as a treatment-liquid application unit that coats a printing surface of the sheet S with a treatment liquid having an effect of aggregation of ink particles to prevent bleed-through.

The printing unit 30 includes a drum 31 and a liquid discharge device 32. The drum 31 is a bearer (rotator) that bears the sheet S on a circumferential surface of the drum 31 and rotates to convey the sheet S (i.e., the drum 31 serves as a conveyor). The liquid discharge device 32 discharges the liquid toward the sheet S borne on the drum 31.

The printing unit 30 further includes transfer cylinders 34 and 35. The transfer cylinder 34 receives the sheet S from the pretreatment unit 20 and forwards the sheet S to the drum 31. The transfer cylinder 35 receives the sheet S conveyed by the drum 31 and forwards the sheet S to the drying unit 40.

The transfer cylinder 34 includes a sheet gripper to grip a leading end of the sheet S conveyed from the pretreatment unit 20 to the printing unit 30. The sheet S thus gripped is conveyed as the transfer cylinder 34 rotates. The transfer cylinder 34 forwards the sheet S to the drum 31 at a position opposite the drum 31.

Similarly, the drum 31 includes a sheet gripper on the surface of the drum 31, and the leading end of the sheet S is gripped by the sheet gripper of the drum 31. The drum 31 has a plurality of suction holes dispersedly on the surface of the drum 31, and a suction unit generates suction airflows directed inward from desired suction holes of the drum 31.

On the drum 31, the sheet gripper grips the leading end of the sheet S forwarded from the transfer cylinder 34, and the sheet S is attracted to and borne on the drum 31 by the suction airflows by the suction unit. As the drum 31 rotates, the sheet S is conveyed.

The liquid discharge device 32 includes discharge head units 33 (discharge head units 33A to 33D) to discharge liquids. For example, the discharge head unit 33A discharges a liquid of cyan (C), the discharge head unit 33B discharges a liquid of magenta (M), the discharge head unit 33C discharges a liquid of yellow (Y), and the discharge head unit 33D discharges a liquid of black (K). Further, the liquid discharge device 32 may include a discharge head unit 33 that discharges special liquid, i.e., liquid of spot color such as white, gold, or silver.

The discharge head unit 33 is, for example, a full-line head having the same configuration as the discharge head unit 33 according to the eighth embodiment or the ninth embodiment. As the discharge head unit 33, for example, a full-line head in which the discharge heads according to any of the first to seventh embodiments are arranged in a staggered manner may be used.

A discharge operation of each of the discharge head units 33 of the liquid discharge device 32 is controlled by a drive signal corresponding to print data. When the sheet S borne on the drum 31 passes through a region facing the liquid discharge device 32, the liquids of respective colors are discharged from the discharge head units 33, and an image corresponding to the print data is formed on the sheet S.

The sheet S moves relative to the liquid discharge device 32, and the relative movement direction is a direction in which the sheet S passes through the region facing the liquid discharge device 32 (i.e., the second direction x). The relative movement direction corresponds to the rotation direction of the drum 31 indicated by arrows illustrated in FIG. 19. The upstream side of the relative movement direction of the sheet S (upstream side of the second direction x) is the upstream side of the rotation direction of the drum 31, and corresponds to the right side of the liquid discharge device 32 in FIG. 19.

The drying unit 40 dries the liquid applied onto the sheet S by the printing unit 30. Thus, a liquid component such as moisture in the liquid evaporates, and the colorant contained in the liquid is fixed on the sheet S. Additionally, curling of the sheet S is reduced.

The reverse unit 60 reverses, in switchback manner, the sheet S that has passed through the drying unit 40 in duplex printing. The reversed sheet S is fed back to the upstream side of the transfer cylinder 34 through a conveyance passage 61 of the printing unit 30.

The ejection unit 50 includes an ejection tray 51 on which multiple sheets S are stacked. The multiple sheets S conveyed through the reverse unit 60 from the drying unit 40 are sequentially stacked and held on the ejection tray 51.

Figure 20:
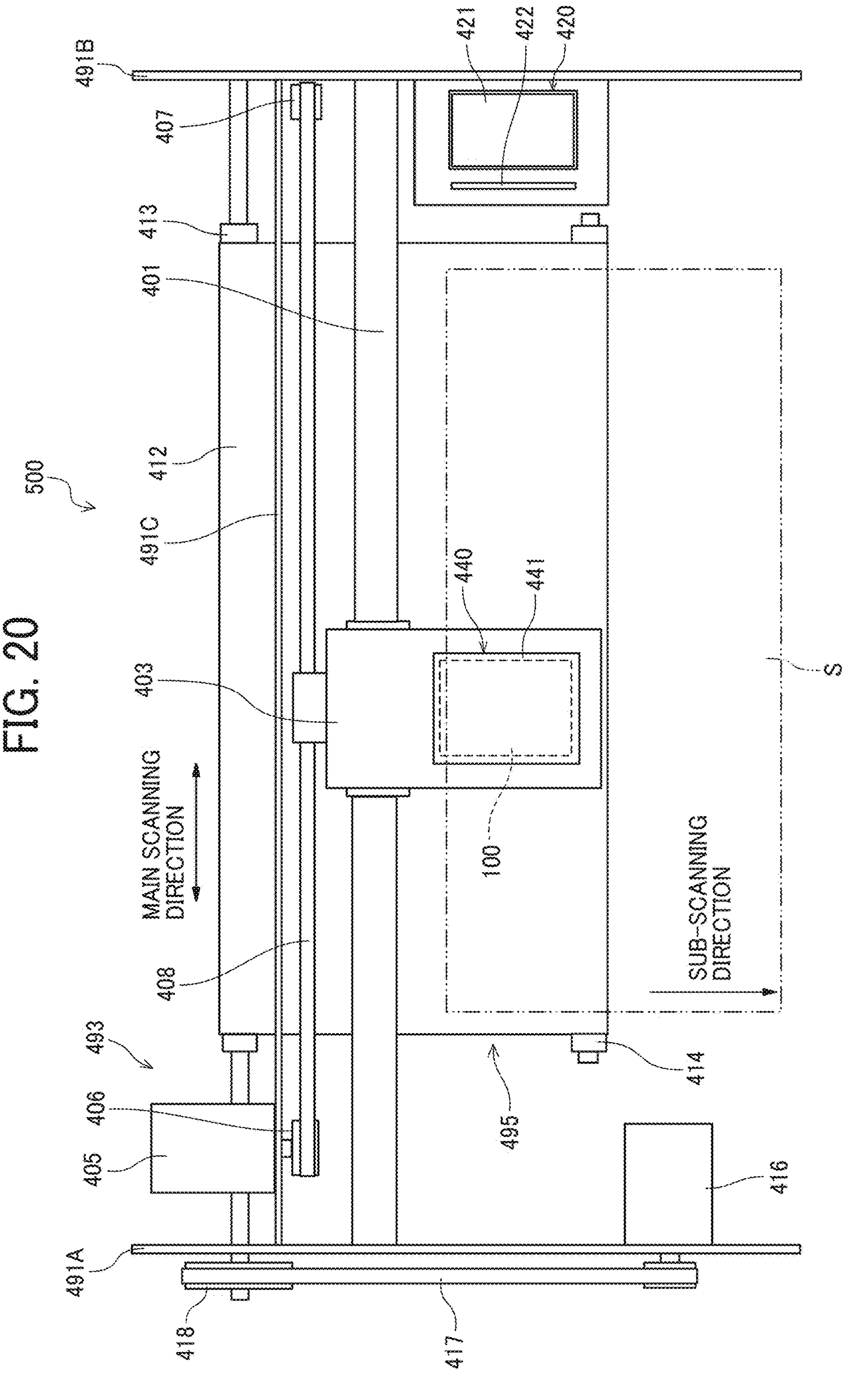
FIG. 20 is a schematic plan view of a part of a printer as a discharge apparatus according to an eleventh embodiment of the present disclosure.
Figure 21:
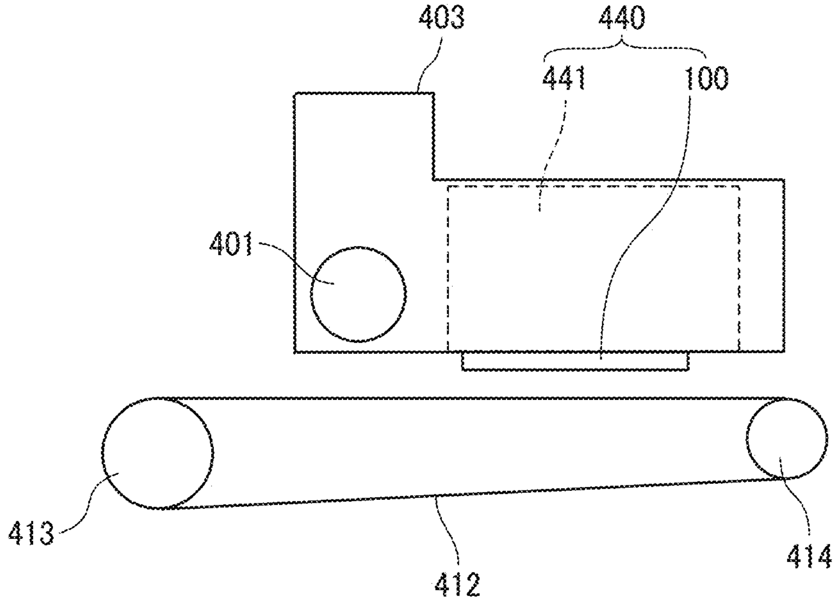
FIG. 21 is a schematic front view of the part of the printer of FIG. 20.

A discharge apparatus according to an eleventh embodiment of the present disclosure is described below with reference to FIGS. 20 and 21. FIG. 20 is a schematic plan view of a part of a printer as the discharge apparatus according to the eleventh embodiment. FIG. 21 is a schematic front view of the part of the printer of FIG. 20.

A printer 500 according to the eleventh embodiment is a serial type apparatus, and a main-scanning moving mechanism 493 reciprocally moves a carriage 403 in a main scanning direction. The main-scanning moving mechanism 493 includes, for example, a guide 401, a main-scanning motor 405, and a timing belt 408. The guide 401 is bridged between left and right side plates 491A and 491B to movably hold the carriage 403. The main-scanning motor 405 reciprocates the carriage 403 in the main scanning direction via the timing belt 408 looped around a drive pulley 406 and a driven pulley 407.

The carriage 403 mounts a liquid discharge unit 440 including the discharge head 100 according to the above-described embodiments of the present disclosure and a head tank 441 as a single integrated unit. The liquid discharge unit 440 may include the discharge head unit 33 according to the above-described embodiments of the present disclosure.

The discharge head 100 of the liquid discharge unit 440 discharges liquids of different colors, for example, yellow (Y), cyan (C), magenta (M), and black (K).

The printer 500 includes a conveyance mechanism 495 to convey a sheet S. The conveyance mechanism 495 includes a conveyance belt 412 as a conveyor and a sub-scanning motor 416 to drive the conveyance belt 412.

The conveyance belt 412 attracts the sheet S and conveys the sheet S to a position facing the discharge head 100. The conveyance belt 412 is an endless belt stretched between a conveyance roller 413 and a tension roller 414. The sheet S can be attracted to the conveyance belt 412 by, for example, electrostatic attraction or air suction.

The conveyance belt 412 circumferentially moves in a sub-scanning direction as the conveyance roller 413 is rotationally driven by the sub-scanning motor 416 via a timing belt 417 and a timing pulley 418.

On one end of the range of movement of the carriage 403 in the main scanning direction, a maintenance mechanism 420 that maintains and recovers the discharge head 100 is disposed lateral to the conveyance belt 412.

The maintenance mechanism 420 includes, for example, a cap 421 to cap the nozzle face (i.e., the surface on which the nozzles 111 are formed) of the discharge head 100 and a wiper 422 to wipe the nozzle face.

The main-scanning moving mechanism 493, the maintenance mechanism 420, and the conveyance mechanism 495 are mounted onto a housing including the side plates 491A and 491B and a back plate 491C.

In the printer 500 having the above-described configuration, the sheet S is fed and attracted onto the conveyance belt 412 and conveyed in the sub-scanning direction (first direction y) by the circumferential movement of the conveyance belt 412.

The discharge head 100 is driven in response to an image signal while the carriage 403 moves in the main scanning direction (second direction x) to discharge liquid onto the sheet S not in motion. As a result, an image is formed on the sheet S.

The discharge head 100 mounted on the carriage 403 moves in the main scanning direction (second direction x) relative to the sheet S. In other words, the sheet S, which is actually not in motion, moves relative to the discharge head 100 in the main scanning direction (second direction x). The upstream of the relative movement of the sheet S relative to the discharge head 100 corresponds to the downstream of the movement of the discharge head 100 by the carriage 403.

The carriage 403 may reciprocate in the main scanning direction in FIG. 20 while the discharge head 100 discharges liquid.

In this case, the downstream of each of the backward and forward movements of the carriage 403 in the main scanning direction corresponds to the upstream of the relative movement of the sheet S in the second direction x.

In the present disclosure, the material to be discharged is not limited to a particular material as long as the material has a viscosity or surface tension to be discharged from a head (discharge head). However, preferably, the viscosity of the material is not greater than 30 millipascal-seconds (mPa·s) under ordinary temperature and ordinary pressure or by heating or cooling. Examples of the liquid to be discharged include a solution, a suspension, or an emulsion including, for example, a solvent, such as water or an organic solvent; a colorant, such as dye or pigment; a functional material, such as a polymerizable compound, a resin, or a surfactant; a biocompatible material, such as deoxyribonucleic acid (DNA), amino acid, protein, or calcium; and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

The term "discharge apparatus" used herein also represents an apparatus including the discharge head unit to drive the discharge head to discharge liquid. The term "discharge apparatus" used here includes, in addition to apparatuses to discharge liquid to a medium onto which liquid can adhere, apparatuses to discharge the liquid into gas (air) or liquid.

The "discharge apparatus" may further include devices relating to feeding, conveying, and ejecting of the medium onto which liquid can adhere and also include a pretreatment device and an aftertreatment device.

The "discharge apparatus" may be, for example, an image forming apparatus to form an image on a sheet by discharging ink, or a three-dimensional fabrication apparatus to discharge fabrication liquid to a powder layer in which powder material is formed in layers to form a three-dimensional object.

The "discharge apparatus" is not limited to an apparatus that discharges liquid to visualize meaningful images such as letters or figures. For example, the liquid discharge apparatus may be an apparatus that forms patterns having no meaning or an apparatus that fabricates three-dimensional images.

The above-described term "medium onto which liquid can adhere" represents a medium on which liquid is at least temporarily adhered, a medium on which liquid is adhered and fixed, or a medium into which liquid adheres and permeates. Specific examples of the "medium onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "medium onto which liquid can adhere" includes any medium to which liquid adheres, unless otherwise specified.

Examples of materials of the "medium onto which liquid can adhere" include any materials to which liquid can adhere even temporarily, such as paper, thread, fiber, fabric, leather, metal, plastic, glass, wood, and ceramic.

The term "discharge apparatus" may be an apparatus to relatively move the discharge head and the medium onto which liquid (i.e., a material to be discharged) can adhere. However, the liquid discharge apparatus is not limited to such an apparatus. For example, the liquid discharge apparatus may be a serial head apparatus that moves the discharge head or a line head apparatus that does not move the discharge head.

Examples of the discharge apparatus further include: a treatment liquid applying apparatus that discharges a treatment liquid onto a surface of a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

Aspects of the present disclosure are, for example, as follows.

Aspect 1

A discharge head includes a nozzle row in which multiple nozzles to discharge a liquid are arrayed in a first direction and a projection projecting toward a nozzle face, on which the nozzle row is arranged, side. An upstream side in a relative movement direction of an application target to which the liquid is applied when the application target moves relative to the multiple nozzles in a second direction intersecting the first direction is defined as an upstream side in the second direction. The projection is disposed on the upstream side, in the second direction, of an end nozzle disposed at, at least, one end of the nozzle row in the first direction. The projection has a first sidewall outside the end nozzle and a second sidewall inside the end nozzle in the first direction. The first sidewall and the second sidewall of the projection have asymmetrical shapes with respect to a plane parallel to the second direction and perpendicular to the nozzle face as a reference.

In other words, a discharge head includes a nozzle face, multiple nozzles, and a projection. The multiple nozzles are arrayed in a first direction on the nozzle face to define a nozzle row, are dischargeable a liquid from each of the multiple nozzles in a discharge direction perpendicular to the nozzle face, and has an end nozzle at an end of the nozzle row in the first direction. The projection projects in the discharge direction from the nozzle face. The projection is disposed: between one side (i.e., an edge) of the nozzle face and the nozzle row in a second direction intersecting the first direction; and at the end nozzle in the first direction. The projection has a first side wall and a second side wall. The first sidewall is disposed outside the end nozzle in the first direction and has a first face perpendicular to the nozzle face and parallel to the second direction. The second sidewall is disposed inside the end nozzle in the first direction and has a second face perpendicular to the nozzle face and slanted or curved with respect to the second direction.

Aspect 2

In the discharge head according to Aspect 1, the first sidewall and the second sidewall of the projection include wall faces extending in the second direction, and a length of the wall face of the first sidewall in the second direction is longer than a length of the wall face of the second sidewall in the second direction.

In other words, the first sidewall has the first face extending in the second direction, and the second sidewall has a third face extending in the second direction. The first face is longer than the third face.

Aspect 3

In the discharge head according to Aspect 1 or 2, the second sidewall of the projection has a wall face extending in the second direction and a wall face slanted with respect to the second direction in plan view on the upstream side in the second direction relative to the wall face extending in the second direction.

In other words, the second sidewall has a third face extending in the second direction and the second face slanted toward the first sidewall with respect to the third face in the second direction. The second face is closer to the one side of the nozzle face than the third face.

Aspect 4

In the discharge head according to Aspect 1 or 2, the second sidewall of the projection has a wall face extending in the second direction and a face curved in plan view on the upstream side in the second direction relative to the wall face extending in the second direction.

In other words, the second sidewall has a third face extending in the second direction and the second face curved toward the first sidewall with respect to the third face in the second direction. The second face is closer to the one side of the nozzle face than the third face.

Aspect 5

In the discharge head according to any one of Aspects 1 to 4, the projection has a width in the first direction at an upstream end in the second direction narrower than a width in the first direction at a downstream end in the second direction.

In other words, the projection has a first end having a first width in the first direction and a second end having a second width narrower than the first width in the first direction. The second end closer to the one side of the nozzle face than the first end.

Aspect 6 In the discharge head according to any one of Aspects 1 to 5, the projections are respectively disposed on the upstream side, in the second direction, of the end nozzles on both sides of the nozzle row.

In other words, the discharge head according to Aspects 1 to 5, further includes two projections including the projection. The nozzle row has both end nozzles including the end nozzle of the multiple nozzles at both ends of the nozzle row in the first direction. The two projections are disposed between the one side of the nozzle face and the nozzle row in the second direction and at the both end nozzles in the first direction, respectively.

Aspect 7

In the discharge head according to any one of Aspects 1 to 5, the projections are respectively disposed on the upstream side, in the second direction, of the end nozzles on both sides of the nozzle row, and the projections on both sides are opposite to each other in the first direction.

In other words, the discharge head according to Aspects 1 to 5, further includes two projections including the projection. The nozzle row has both end nozzles including the end nozzle of the multiple nozzles at both ends of the nozzle row in the first direction. The two projections are disposed between the one side of the nozzle face and the nozzle row in the second direction and at the both end nozzles in the first direction, respectively. The two projections are opposite each other in the first direction.

Aspect 8

In the discharge head according to any one of Aspects 1 to 7, a recess is opened in the first direction on the second sidewall.

In other words, the projection has a recess recessed in the first direction on the second sidewall.

Aspect 9

A discharge head includes a nozzle row in which multiple nozzles to discharge a liquid are arrayed in a third direction and a projection projecting toward a nozzle face, on which the nozzle row is arranged, side. An upstream side in a relative movement direction of an application target to which the liquid is applied when the application target moves relative to the multiple nozzles in a second direction intersecting the third direction is defined as an upstream side in the second direction. The projection is disposed at an end of the nozzle row in the third direction. The projection is disposed on the upstream side, in the second direction, of an end nozzle on the most upstream side in the second direction. The projection has a first sidewall outside the end nozzle and a second sidewall inside the end nozzle in the third direction. The first sidewall and the second sidewall of the projection have asymmetrical shapes with respect to a plane parallel to the second direction and perpendicular to the nozzle face as a reference.

In other words, a discharge head includes a nozzle face, multiple nozzles, and a projection. The nozzle face has longitudinal sides extending in a first direction and transverse sides extending in a second direction intersecting the first direction. The multiple nozzles are arrayed in a third direction intersecting the first direction and the second direction on the nozzle face to define a nozzle row, are dischargeable a liquid from each of the multiple nozzles in a discharge direction perpendicular to the nozzle face, and has an end nozzle at an end of the nozzle row in the third direction. The projection projects in the discharge direction from the nozzle face. The projection is disposed: between one of the longitudinal sides and the nozzle row in the second direction; and at the end nozzle closest to the one of the longitudinal sides among the multiple nozzles in the second direction. The projection has a first sidewall and a second sidewall. The first sidewall is disposed outside the end nozzle in the first direction and has a first face perpendicular to the nozzle face and parallel to the second direction. The second sidewall is disposed inside the end nozzle in the first direction and has a second face perpendicular to the nozzle face and slanted or curved with respect to the second direction.

Aspect 10

A discharge head unit includes at least two discharge heads each having a nozzle row in which multiple nozzles to discharge a liquid are arrayed in a first direction. A relative movement direction, intersecting the first direction, of an application target to which the liquid is applied is defined as a second direction. The two discharge heads are arranged in the first direction at positions shifted in the second direction such that one or more nozzles at an end of the nozzle row of each discharge head overlap as viewed in the second direction. An upstream side in the relative movement direction of the application target is defined as an upstream side in the second direction. A projection projecting from the nozzle face is disposed on an upstream side, in the second direction, of an end nozzle disposed at an end portion on a joint portion side where the nozzles of the nozzle rows of the two discharge heads overlap as viewed in the second direction. The projection has a first sidewall outside the end nozzle and a second sidewall inside the end nozzle in the first direction. The first sidewall and the second sidewall of the projection have asymmetrical shapes with respect to a plane parallel to the second direction and perpendicular to the nozzle face as a reference.

Aspect 11

A discharge head unit includes at least two discharge heads arranged in a first direction and each having multiple nozzle rows in which multiple nozzles to discharge a liquid are arrayed in a third direction. A relative movement direction, intersecting the first direction, of an application target to which the liquid is applied is defined as a second direction. The two discharge heads are arranged such that one or more nozzles at an end of the nozzle row of each discharge head overlap as viewed in the second direction. An upstream side in the relative movement direction of the application target is defined as an upstream side in the second direction. A projection projecting from the nozzle face is disposed on an upstream side, in the second direction, of an end nozzle disposed on the most upstream side in the second direction among the nozzles in a joint portion where the nozzles overlap as viewed in the second direction. The projection has a first sidewall outside the end nozzle and a second sidewall inside the end nozzle in the first direction. The first sidewall and the second sidewall of the projection have asymmetrical shapes with respect to a plane parallel to the second direction and perpendicular to the nozzle face as a reference.

In other words, a discharge head unit includes a first discharge head and a second discharge head joined to the first discharge head in a first direction to form a joint portion extending in a second direction intersecting the first direction between the first discharge head and the second discharge head. Each of the first discharge head and the second discharge head includes a nozzle face, multiple nozzles, and a projection. The nozzle face has longitudinal sides extending in the first direction. The multiple nozzles are arrayed in a third direction intersecting the first direction and the second direction on the nozzle face in multiple rows in the second direction to define multiple nozzle rows; are dischargeable a liquid from each of the multiple nozzles in a discharge direction perpendicular to the nozzle face; and has an end nozzle at an end of the multiple nozzle rows in the third direction. At least one of the multiple nozzles at an end of the multiple nozzle rows of the first discharge head overlaps with at least one of the multiple nozzles at an end of the multiple nozzle rows of the second discharge head in the first direction in the joint portion. The projection is disposed between one of the longitudinal sides and the end nozzle. The end nozzle is disposed in the joint portion and closest to the one of the longitudinal sides among the multiple nozzles of the first discharge head and the second discharge head in the second direction. The projection projects in the discharge direction from the nozzle face of one of the first discharge head and the second discharge head having the end nozzle. The projection has a first side wall and a second sidewall. The first sidewall is disposed outside the end nozzle in the first direction and has a first face perpendicular to the nozzle face and parallel to the second direction. The second sidewall is disposed inside the end nozzle in the first direction and has a second face perpendicular to the nozzle face and slanted or curved with respect to the second direction.

Aspect 12 In the discharge head unit according to Aspect 11, an auxiliary projection projecting from the nozzle face is disposed on the joint portion side of the nozzle row of the discharge head other than the discharge head including the end nozzle on the most upstream side in the second direction among the two discharge heads, and on the upstream side of the nozzle row in the second direction.

In other words, the discharge head unit according to Aspect 11, further includes another projection: disposed between one of the longitudinal sides and another end nozzle, in the joint portion, of another of the first discharge head and the second discharge head; and projecting in the discharge direction from the nozzle face of said another of the first discharge head and the second discharge head.

Aspect 13

In the discharge head unit according to Aspect 11 or 12, the two discharge heads are arranged at positions shifted in the second direction.

In other words, the first discharge head and the second discharge head are arranged at positions shifted from each other in the second direction.

Aspect 14

A discharge apparatus includes the discharge head according to any one of Aspects 1 to 9.

In other words, a discharge apparatus includes the discharge head according to Aspects 1 to 9 and a conveyor to convey an object to the discharge head in a conveyance direction opposite to the second direction to apply the liquid onto the object by the discharge head. The projection is disposed upstream from the end nozzle in the conveyance direction.

Alternatively, a discharge apparatus includes the discharge head according to Aspects 1 to 9 and a main-scanning moving mechanism to move the discharge head relative to an object in the second direction while applying the liquid onto the object by the discharge head. The projection is disposed downstream from the end nozzle in the second direction.

Aspect 15

A discharge apparatus includes the discharge head unit according to any one of Aspects 10 to 13.

In other words, a discharge apparatus includes the discharge head unit according to Aspects 10 to 13 and a conveyor to convey an object to the discharge head unit in a conveyance direction opposite to the second direction to apply the liquid onto the object by the discharge head unit. The projection is disposed upstream from the end nozzle in the conveyance direction.

Alternatively, a discharge apparatus includes the discharge head unit according to Aspects 10 to 13 and a main-scanning moving mechanism to move the discharge head unit relative to an object in the second direction while applying the liquid onto the object by the discharge head unit. The projection is disposed downstream from the end nozzle in the second direction.

Aspect 16

A printer includes the discharge apparatus according to Aspect 14.

In other words, a printer includes the discharge apparatus according to Aspect 14 and a maintenance mechanism to maintain and recover the discharge head.

Aspect 17

A printer includes the discharge apparatus according to Aspect 15.

In other words, a printer includes the discharge apparatus according to Aspect 15 and a maintenance mechanism to maintain and recover the discharge head.

As described above, according to one aspect of the present disclosure, droplets discharged from the end nozzle in the nozzle row can be prevented from being bent.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A discharge head comprising:
- a nozzle face;
- multiple nozzles:
  - arrayed in a first direction on the nozzle face to define a nozzle row;
  - dischargeable a liquid from each of the multiple nozzles in a discharge direction perpendicular to the nozzle face; and
  - having an end nozzle at an end of the nozzle row in the first direction; and
- a projection:
  - projecting in the discharge direction from the nozzle face;
  - disposed:
    - between one side of the nozzle face and the nozzle row in a second direction intersecting the first direction; and
    - at the end nozzle in the first direction; and
  - having:
    - a first sidewall:
      - outside the end nozzle in the first direction; and
      - having a first face perpendicular to the nozzle face and parallel to the second direction; and
    - a second sidewall:

inside the end nozzle in the first direction; and having a second face perpendicular to the nozzle face and slanted or curved with respect to the second direction.

2. The discharge head according to claim 1, wherein the first sidewall has the first face extending in the second direction, the second sidewall has a third face extending in the second direction, and the first face is longer than the third face.

3. The discharge head according to claim 1, wherein the second sidewall has: a third face extending in the second direction; and the second face slanted toward the first sidewall with respect to the third face in the second direction, and the second face is closer to the one side of the nozzle face than the third face.

4. The discharge head according to claim 1, wherein the second sidewall has: a third face extending in the second direction; and the second face curved toward the first sidewall with respect to the third face in the second direction, and the second face is closer to the one side of the nozzle face than the third face.

5. The discharge head according to claim 1, wherein the projection has: a first end having a first width in the first direction; and a second end having a second width narrower than the first width in the first direction, and the second end is closer to the one side of the nozzle face than the first end.

6. The discharge head according to claim 1, further comprising two projections including the projection, wherein the nozzle row has both end nozzles including the end nozzle of the multiple nozzles at both ends of the nozzle row in the first direction, the two projections are disposed: between the one side of the nozzle face and the nozzle row in the second direction; and at the both end nozzles in the first direction, respectively.

7. The discharge head according to claim 1, further comprising two projections including the projection, wherein the nozzle row has both end nozzles including the end nozzle of the multiple nozzles at both ends of the nozzle row in the first direction, the two projections are disposed: between the one side of the nozzle face and the nozzle row in the second direction; and at the both end nozzles in the first direction, respectively, and the two projections are opposite each other in the first direction.

8. The discharge head according to claim 1, wherein the projection has a recess recessed in the first direction on the second sidewall.

9. A discharge apparatus comprising: the discharge head according to claim 1; and a conveyor to convey an object to the discharge head in a conveyance direction opposite to the second direction to apply the liquid onto the object by the discharge head, wherein the projection is disposed upstream from the end nozzle in the conveyance direction.

10. A printer comprising: the discharge apparatus according to claim 9; and a maintenance mechanism to maintain and recover the discharge head.

11. A discharge apparatus comprising: the discharge head according to claim 1; and a main-scanning moving mechanism to move the discharge head relative to an object in the second direction while applying the liquid onto the object by the discharge head, wherein the projection is disposed downstream from the end nozzle in the second direction.

12. A discharge head comprising:
a nozzle face having:
longitudinal sides extending in a first direction; and
transverse sides extending in a second direction intersecting the first direction;
multiple nozzles:
arrayed in a third direction intersecting the first direction and the second direction on the nozzle face to define a nozzle row,
dischargeable a liquid from each of the multiple nozzles in a discharge direction perpendicular to the nozzle face; and
having an end nozzle at an end of the nozzle row in the third direction; and
a projection:
projecting in the discharge direction from the nozzle face;
disposed:
between one of the longitudinal sides and the nozzle row in the second direction; and
at the end nozzle in the first direction, the end nozzle closest to the one of the longitudinal sides among the multiple nozzles in the second direction; and
having:
a first sidewall:
outside the end nozzle in the first direction; and
having a first face perpendicular to the nozzle face and parallel to the second direction; and
a second sidewall:
inside the end nozzle in the first direction; and
having a second face perpendicular to the nozzle face and slanted or curved with respect to the second direction.

13. A discharge apparatus comprising: the discharge head according to claim 12; and a conveyor to convey an object to the discharge head in a conveyance direction opposite to the second direction to apply the liquid onto the object by the discharge head, wherein the projection is disposed upstream from the end nozzle in the conveyance direction.

14. A discharge apparatus comprising: the discharge head according to claim 12; and a main-scanning moving mechanism to move the discharge head relative to an object in the second direction while applying the liquid onto the object by the discharge head, wherein the projection is disposed downstream from the end nozzle in the second direction.

15. A discharge head unit comprising:
a first discharge head; and
a second discharge head joined to the first discharge head in a first direction to form a joint portion extending in a second direction intersecting the first direction between the first discharge head and the second discharge head, each of the first discharge head and the second discharge head including:
a nozzle face having longitudinal sides extending in the first direction;

multiple nozzles:
arrayed in a third direction intersecting the first direction and the second direction on the nozzle face in multiple rows in the second direction to define multiple nozzle rows;
dischargeable a liquid from each of the multiple nozzles in a discharge direction perpendicular to the nozzle face; and
having an end nozzle at an end of the multiple nozzle rows in the third direction, at least one of the multiple nozzles at an end of the multiple nozzle rows of the first discharge head overlapping with at least one of the multiple nozzles at an end of the multiple nozzle rows of the second discharge head in the first direction in the joint portion; and
a projection:
disposed between one of the longitudinal sides and the end nozzle:
in the joint portion; and
closest to the one of the longitudinal sides among the multiple nozzles of the first discharge head and the second discharge head in the second direction;
projecting in the discharge direction from the nozzle face of one of the first discharge head and the second discharge head having the end nozzle; and
having:
a first sidewall:
outside the end nozzle in the first direction; and
having a first face perpendicular to the nozzle face and parallel to the second direction; and
a second sidewall:
inside the end nozzle in the first direction; and
having a second face perpendicular to the nozzle face and slanted or curved with respect to the second direction.

16. The discharge head unit according to claim 15, further comprising another projection:
disposed between one of the longitudinal sides and another end nozzle, in the joint portion, of another of the first discharge head and the second discharge head; and
projecting in the discharge direction from the nozzle face of said another of the first discharge head and the second discharge head.

17. The discharge head unit according to claim 15,
wherein the first discharge head and the second discharge head are arranged at positions shifted from each other in the second direction.

18. A discharge apparatus comprising:
the discharge head unit according to claim 15; and
a conveyor to convey an object to the discharge head unit in a conveyance direction opposite to the second direction to apply the liquid onto the object by the discharge head unit,
wherein the projection is disposed upstream from the end nozzle in the conveyance direction.

19. A printer comprising:
the discharge apparatus according to claim 18; and
a maintenance mechanism to maintain and recover the discharge head unit.

20. A discharge apparatus comprising:
the discharge head unit according to claim 15; and
a main-scanning moving mechanism to move the discharge head unit relative to an object in the second direction while applying the liquid onto the object by the discharge head unit,
wherein the projection is disposed downstream from the end nozzle in the second direction.

* * * * *